(12) United States Patent
Nishisaka et al.

(10) Patent No.: US 8,276,796 B2
(45) Date of Patent: Oct. 2, 2012

(54) DEVICE AND METHOD FOR CUTTING OFF SUBSTRATE OF FRAGILE MATERIAL

(75) Inventors: Yuki Nishisaka, Osaka (JP); Kenji Otoda, Osaka (JP); Shuichi Inoue, Osaka (JP); Toru Kumagai, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 672 days.

(21) Appl. No.: 11/915,894

(22) PCT Filed: May 26, 2006

(86) PCT No.: PCT/JP2006/310541
§ 371 (c)(1),
(2), (4) Date: Oct. 20, 2009

(87) PCT Pub. No.: WO2006/129563
PCT Pub. Date: Dec. 7, 2006

(65) Prior Publication Data
US 2010/0065599 A1    Mar. 18, 2010

(30) Foreign Application Priority Data
May 30, 2005  (JP) .................................. 2005-187324

(51) Int. Cl.
*B26F 1/20* (2006.01)
(52) U.S. Cl. ........................................ 225/96.5; 225/93
(58) Field of Classification Search ............... 225/93, 225/96.5, 103, 104; 83/879, 883, 884, 885, 83/886
See application file for complete search history.

(56) References Cited

U.S. PATENT DOCUMENTS

| | | | | | |
|---|---|---|---|---|---|
| 1,591,179 | A | * | 7/1926 | Myers | 65/25.3 |
| 1,930,582 | A | * | 10/1933 | Burdett et al. | 225/96.5 |
| 3,396,452 | A | * | 8/1968 | Sato et al. | 438/464 |
| 3,593,899 | A | * | 7/1971 | DeTorre | 225/2 |
| 3,779,437 | A | * | 12/1973 | Yamamoto et al. | 225/96.5 |
| 4,018,372 | A | * | 4/1977 | Insolio | 225/2 |
| 4,049,167 | A | * | 9/1977 | Guissard | 225/2 |
| 4,088,255 | A | * | 5/1978 | DeTorre | 225/98 |
| 4,109,841 | A | * | 8/1978 | DeTorre | 225/96.5 |
| 7,080,766 | B2 | * | 7/2006 | McEntee et al. | 225/96.5 |

FOREIGN PATENT DOCUMENTS

| | | | |
|---|---|---|---|
| DE | 3140087 A1 | * | 4/1983 |
| JP | 49-31289 | | 8/1974 |
| JP | 49-37101 | | 10/1974 |
| JP | 50-15807 | | 2/1975 |
| JP | 53-55319 | | 5/1978 |

(Continued)

OTHER PUBLICATIONS

International Search Report dated Aug. 29, 2006.

*Primary Examiner* — Kenneth E. Peterson
*Assistant Examiner* — Jennifer Swinney
(74) *Attorney, Agent, or Firm* — Snell & Wilmer L.L.P.

(57) ABSTRACT

A brittle material substrate cutting method and cutting apparatus are provided, which prevent cut faces of a brittle material substrate from contacting each other after the cutting in a break step of continuously cutting the brittle material substrate, so that a damage or contamination on the brittle material substrate due to the contact can be prevented.

16 Claims, 14 Drawing Sheets

FOREIGN PATENT DOCUMENTS

| | | | | |
|---|---|---|---|---|
| JP | 60112634 A | * | 6/1985 | |
| JP | 63104442 A | * | 5/1988 | |
| JP | 01261238 A | * | 10/1989 | |
| JP | 05085764 A | * | 4/1993 | |
| JP | 2000103633 A | * | 4/2000 | |
| JP | 2000-191333 | | 7/2000 | |
| JP | 2002-018797 | | 1/2002 | |

* cited by examiner

FIG.4
(a) 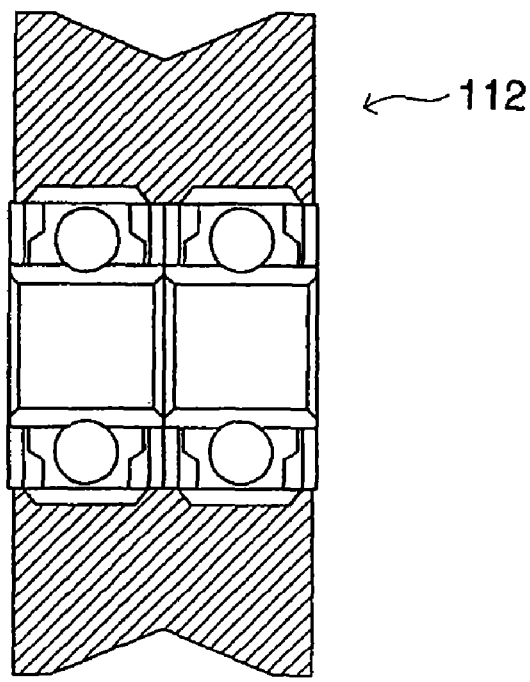
(b) 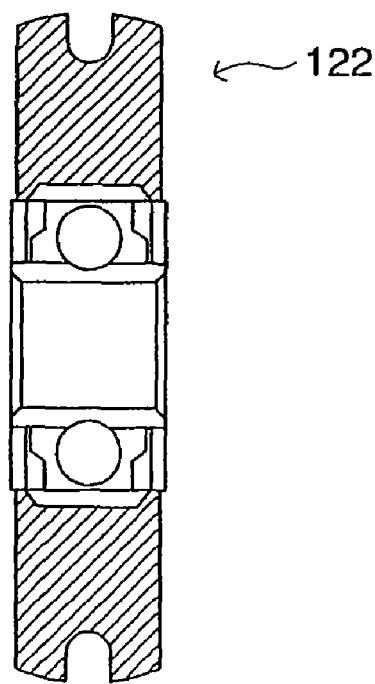

FIG.12
(a)
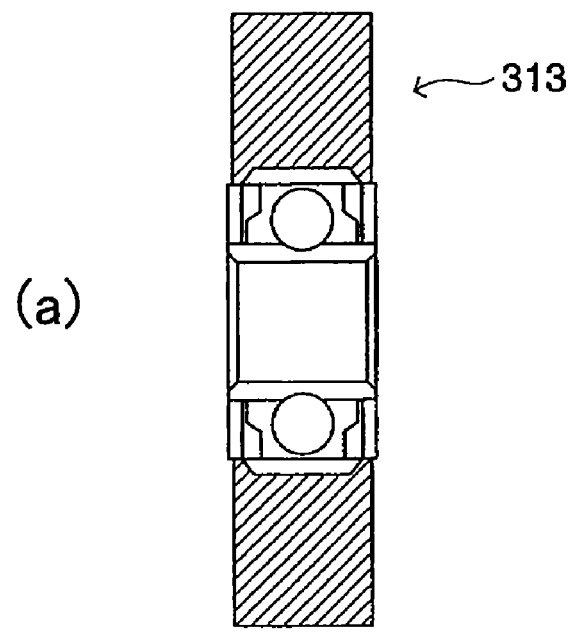
(b)
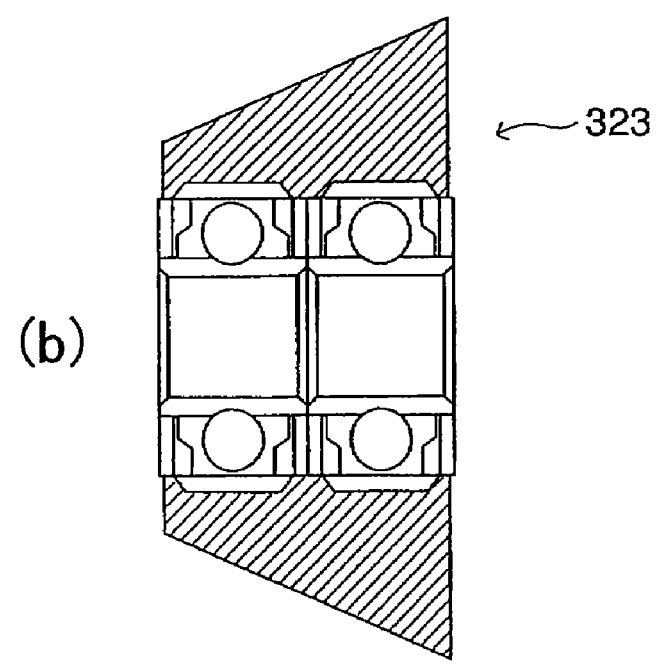

FIG.16 (PRIOR ART)
(a) 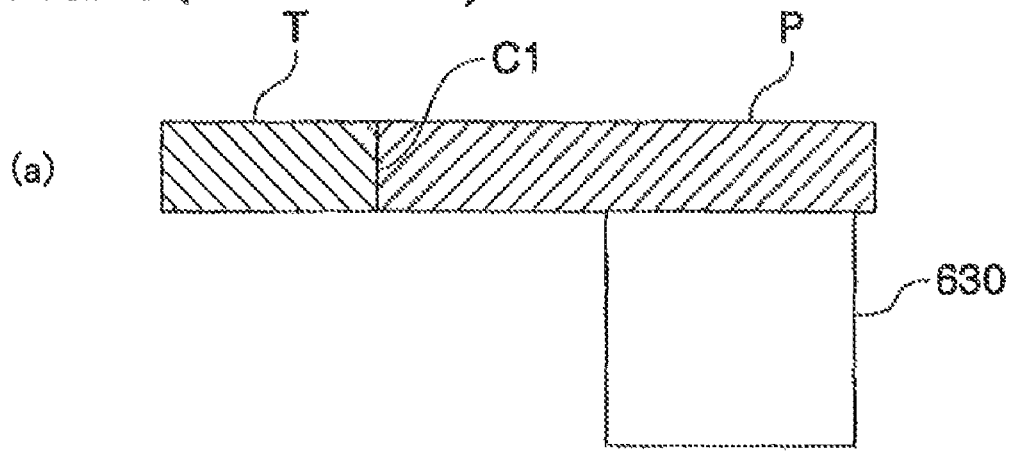
(b) 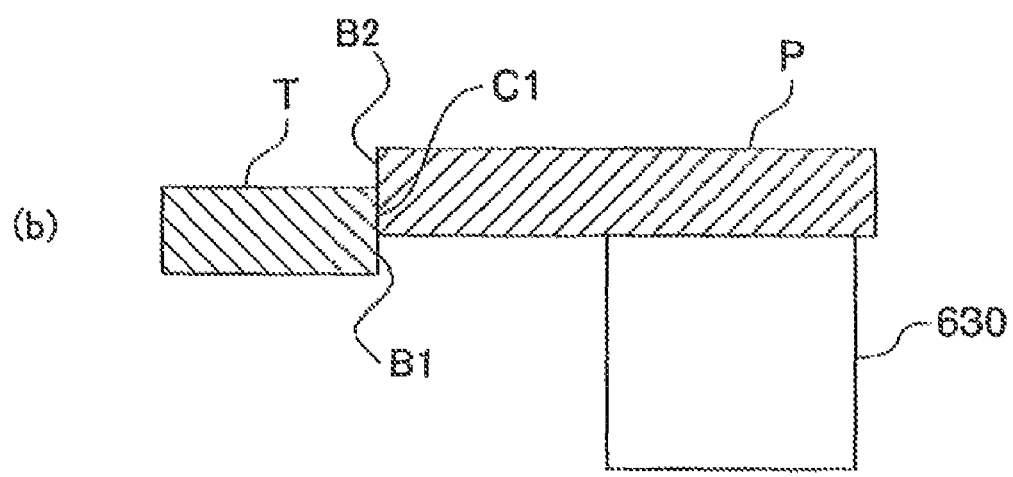
(c) 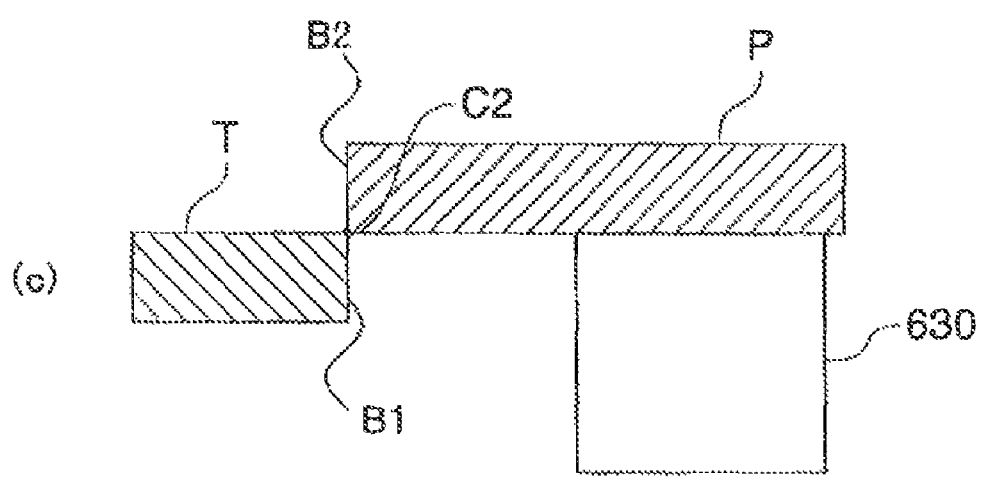

DEVICE AND METHOD FOR CUTTING OFF SUBSTRATE OF FRAGILE MATERIAL

CROSS-REFERENCE TO RELATED APPLICATIONS

This application is U.S. national phase filing under 35 U.S.C. §371 of PCT/JP2006/310541 filed May 26, 2006 and claims priority from Japanese Application No. 2005-187324 which was filed on May 30, 2005.

TECHNICAL FIELD

The present invention relates to a cutting apparatus and a cutting method for a brittle material substrate (e.g., glass, semiconductor and ceramic), and in particular, the present invention relates to a brittle material substrate cutting apparatus and a brittle material substrate cutting method for cutting a brittle material substrate by applying a force along a scribe line formed on the brittle material substrate.

BACKGROUND ART

A brittle material substrate is generally cut using a method to be described below. First, a scribe line including a vertically-formed crack (hereinafter, referred to as "vertical crack") is formed along a desired line to be cut on one surface of a brittle material substrate using such as sintered diamond cutter wheel, laser irradiation apparatus or the like (hereinafter, referred to as "scribing step"). Thereafter, a pressure is applied upon the brittle material substrate along the scribe line, or the brittle material substrate is bent along the scribe line, thereby affecting a pulling force on substrate portions located on both sides of the scribe line to extend the vertical crack in a thickness direction of the brittle material substrate so as to reach the other surface (hereinafter, referred to as "bottom surface") of the substrate G. As such, the brittle material substrate is cut along the scribe line (hereinafter, referred to as "breaking step").

Reference 1 discloses a conventional cutting apparatus for performing the breaking step described above. The conventional cutting apparatus for performing the breaking step described above will be described with reference to FIG. 14 and FIG. 15. A cutting apparatus 6 shown in FIG. 14 includes: a table 630 (see FIG. 15) for holding a substrate G formed with a scribe line thereon; a first auxiliary roller 611 and a second auxiliary roller 621 arranged with the table 630 therebetween so as to oppose each other in an upper and lower direction; a substrate holding break roller 612 and a pressing break roller 622 arranged with the substrate G therebetween so as to oppose each other in the upper and lower direction; and a third auxiliary roller 613 and a fourth auxiliary roller 623 arranged with the substrate G therebetween so as to oppose each other in the upper and lower direction.

The first auxiliary roller 611 and the second auxiliary roller 621, the substrate holding break roller 612 and the pressing break roller 622, and the third auxiliary roller 613 and the fourth roller 623 are arranged such that central portions thereof in their axial direction are approximately aligned, respectively.

When the breaking step is performed by the cutting apparatus 6, the substrate G is mounted on the table 630 such that the central portion of each of the rollers 611 to 613 and 621 to 623 in its axial direction is approximately aligned with a scribe line S formed on the substrate G, as shown in FIG. 15. Next, the first auxiliary roller 611 and the second auxiliary roller 621, and the third auxiliary roller 613 and the fourth auxiliary roller 623 are each moved to a position by an air cylinder so as to contact the substrate G and held there. In addition, the substrate holding break roller 612 and the pressing break roller 622 are each moved to a position where they are each pressed upon the substrate G by a motor M with a predetermined pressure and held there. The rollers 611 to 613 and 621 to 623 are entirely moved in +X direction such that the rollers 611 to 613 and 621 to 623 are moved along the scribe line S. As such, the first auxiliary roller 611 and the second auxiliary roller 621, the substrate holding break roller 612 and the pressing break roller 622, and the third auxiliary roller 613 and the fourth auxiliary roller 623 are sequentially rolled on a top surface and a bottom surface of the substrate G along the scribe line S, respectively.

An operation for cutting the brittle substrate material by performing the breaking step by the cutting apparatus 6 will be described in detail with reference to FIG. 15. FIG. 15 is a schematic view for describing an operation of each of the rollers 611 to 613 and 621 to 623 included in the cutting apparatus 6.

The pressing break roller 622 arranged below the substrate G presses a portion on the bottom surface of the substrate G upward that corresponds to the scribe line S. The substrate holding break roller 612 arranged so as to oppose the pressing break roller 622 presses portions on both sides of the scribe line S on the top surface of the substrate G downward. In this case, the portions on both sides of the scribe line S pressed by the substrate holding break roller 612 correspond to portions on both sides of the portion that corresponds to the scribe line S on the substrate G and that is pressed upward by the pressing break roller 622. The portion of the substrate G formed with the scribe line S is pressed upward by the pressing break roller 622, and at the same time, the portions on both sides of the portion are pressed downward by the substrate holding break roller 612. In such a state, the substrate holding break roller 612 and the pressing break roller 622 are rolled on the top surface and the bottom surface of the substrate G along the scribe line S, respectively.

As such, a vertical crack forming the scribe line S is sequentially expanded from the top surface of the substrate G, and the vertical crack is extended in a thickness direction of the substrate G to reach the bottom surface of the substrate G. As a result, the substrate G is cut.

The first auxiliary roller 611 and the second auxiliary roller 621, and the third auxiliary roller 613 and the fourth auxiliary roller 614 are each a columnar roller having an outer circumferential surface thereof with a predetermined diameter. The first auxiliary roller 611 and the second auxiliary roller 621 suppress a distortion of the substrate G before the cutting of the substrate G and prevent the vertical crack from extending in any directions other than a vertical direction. The third auxiliary roller 613 and the fourth auxiliary roller 623 suppress a distortion of the substrate G after the cutting of the substrate G and prevent cut faces B1 and B2 of newly-formed substrate portions by cutting the substrate G from contacting each other in an inclined state.

Reference 1: International Publication WO 2004/096721 pamphlet

DISCLOSURE OF THE INVENTION

However, positions of the cut faces B1 and B2 of the substrate portions cut by the conventional cutting apparatus 6 are not controlled, and as a matter of fact, the cut faces B1 and B2 contact each other. As such, due to the pressing, friction or the like of the cut faces B1 and B2 to each other, a surface defect (e.g., scratch, chipping or the like) occurs on the cut faces B1 and B2, thus resulting in the generation of dust, a broken piece or the like of the brittle material.

For example, a case in which a substrate is manufactured will be examined, wherein one of side edge portions of the substrate G is cut, and the side edge portion that is an unnecessary portion is removed in order to make a product. In this case, when the width of the side edge portion to be separated is small, it is difficult to hold the separated side edge portion with the table described above or the like. In such a case, a substrate portion to become a product is held by a suctioning table or the like while the side edge portion to be separated is not held at all, thus causing problems to be described below.

Portions (a) to (c) of FIG. 16 show cross-sectional views of the substrate G in a sequential manner in the order of Portion (a) of FIG. 16, Portion (b) of FIG. 16 and Portion (c) of FIG. 16 after the passing of the rollers in the breaking step by the cutting apparatus 6. A substrate portion P shown in each of Portions (a) to (c) of FIG. 16 is a product substrate held by the table 630 after the cutting. A side edge portion T is a substrate portion (unnecessary portion) that is not held by a table or the like after the cutting. The side edge portion T after the cutting sinks downward due to its own weight as the rollers move away from the side edge portion T. Therefore, in a portion C1 where cut faces B1 and B2 shown in Portion (a) of FIG. 16 and Portion (b) of FIG. 16 contact each other, the cut face B1 of the side edge portion T is moved downward while causing a friction against the cut face B2 of the held substrate portion P. Thus, there is a concern that an abrasion may occur on the cut faces B1 and B2.

In addition, a point C2 shown in Portion (c) of FIG. 16 is a point where a corner portion of the top surface of the cut face B1 of the side edge portion T and a corner portion of the bottom surface of the cut face B2 of the substrate portion P contact each other. A pressing force is likely to accumulate on the point C2, and thus there is a concern that a chipping may occur on the bottom surface of the cut face B2 of the substrate portion P. The position of the point C2 having an accumulated pressing force changes together with the movement of the rollers, and thus there is a concern that a chipping or the like may occur at the corner portion of the bottom surface of the cut face B2 over the almost entire cut face B2 of the substrate portion P. As described above, when one of the substrate portions to be separated by cutting is not held by a table or the like, there is a concern that a surface defect (e.g., scratch, chipping or the like) occurs on a cut face of the substrate portion held by a table or the like. Moreover, there is a concern that the substrate portion may be contaminated with dust, a broken piece or the like of the brittle material, thereby making the problems more obvious.

As described above, the contact of the cut faces B1 and B2 to each other in the breaking step becomes a cause of impairing the quality of the substrate to be produced, and contaminating the substrate with generated dust and broken piece of the substrate material. As a result, this becomes a cause of reducing a yield of product and increasing a manufacturing cost, and this also becomes a cause of increasing a facility cost due to the requirement of extra facility such as substrate cleaning apparatus.

The objective of the present invention is to provide: a brittle material substrate cutting method for preventing a contact of cut faces after the cutting in a break step of continuously cutting a brittle material substrate along a scribe line so as to prevent a surface defect (e.g., scratch, chipping or the like) on the cut faces and to prevent the brittle material substrate from being contaminated with dust, a broken piece of the brittle material; and a brittle material substrate cutting apparatus used for implementing the brittle material substrate cutting method.

A brittle material substrate cutting apparatus according to the present invention includes: a cutting section for cutting a brittle material substrate into a first substrate portion and a second substrate portion by applying a pressure in a vicinity of a scribe line having a vertical crack formed beforehand on a top surface of the brittle material substrate so as to extend the vertical crack to reach a bottom surface of the brittle material substrate, the pressure movable along and relative to the scribe line; and a cut-face separating section for contacting a top surface and a bottom surface of the first substrate portion and moving the first substrate portion in a direction to move away a cut face of the first substrate portion from a cut face of the second substrate portion.

The cut-face separating section may include: a first roller for generating a force to separate the first substrate portion from the second substrate portion by rolling of the first roller on the top surface of the first substrate portion while pressed upon the top surface of the first substrate portion and elastically deformed; and a second roller, arranged so as to oppose the first roller with the first substrate portion therebetween, for generating a force to separate the first substrate portion from the second substrate portion by rolling of the second roller on the bottom surface of the first substrate portion while pressed upon the bottom surface of the first substrate portion and elastically deformed.

The size of a diameter of each of the first roller and the second roller in its axial direction may gradually increase from one side thereof toward the other side, and a portion of each of the first roller and the second roller having a small diameter may be arranged so as to be adjacent to the cut face.

The cut-face separating section may include: a first roller, arranged such that a direction orthogonal to a rotation axis of the first roller intersects the scribe line at an acute angle in front of a moving direction of the pressure, for generating a force to separate the first substrate portion from the second substrate portion by rolling of the first roller on the top surface of the first substrate portion; and a second roller, arranged so as to oppose the first roller with the first substrate portion therebetween and to be parallel to the first roller, for generating a force to separate the first substrate portion from the second substrate portion by rolling of the second roller on the bottom surface of the first substrate portion.

The cut-face separating section may include: a first belt conveyor mechanism for generating a force to separate the first substrate portion from the second substrate portion by circling of a belt while the belt is pressed upon the top surface of the first substrate portion and elastically deformed, the first belt conveyor mechanism having a ring belt wound around a plurality of wheels, rotation axes of the plurality of wheels parallel to each other, a thickness of the belt in its width direction gradually increasing from one side edge thereof toward the other side edge, the thin side edge arranged so as to be adjacent to the cut face; and a second belt conveyor mechanism for generating a force to separate the first substrate portion from the second substrate portion by circling of a belt while the belt is pressed upon the bottom surface of the first substrate portion and elastically deformed, the second belt conveyor mechanism having a ring belt wound around a plurality of wheels, rotation axes of the plurality of wheels parallel to each other, a thickness of the belt in its width direction gradually increasing from one side edge thereof toward the other side edge, the thin side edge arranged so as to be adjacent to the cut face.

The cut-face separating section may include: a first belt conveyor mechanism for generating a force to separate the first substrate portion from the second substrate portion by circling of a belt while the belt is pressed upon the top surface of the first substrate portion, the first belt conveyor mechanism having a ring belt wound around a plurality of wheels, rotation axes of the plurality of wheels is parallel to each other, the first belt conveyor mechanism arranged such that a direction orthogonal to each of the wheels intersects the scribe line at an acute angle in front of a moving direction of the pressure; and a second belt conveyor mechanism for generating a force to separate the first substrate portion from the second substrate portion by circling of a belt while the belt is pressed upon the bottom surface of the first substrate portion, the second belt conveyor mechanism having a ring belt wound around a plurality of wheels, rotation axes of the plurality of wheels parallel to each other, the second belt conveyor mechanism arranged so as to oppose the first belt conveyor mechanism with the first substrate portion therebetween.

The cut-face separating section may contact a top surface and a bottom surface of the second substrate portion and move the second substrate portion in a direction to move away the cut face of the second substrate portion from the cut face of the first substrate portion.

The cut-face separating section may include: a first roller for generating a force to separate the first substrate portion and the second substrate portion from each other by the rotation of the first roller while pressed upon a top surface of each of the first substrate portion and the second substrate portion and elastically deformed; and a second roller for generating a force to separate the first substrate portion and the second substrate portion from each other by the rotation of the second roller while pressed upon a bottom portion corresponding to the top surface of each of the first substrate portion and the second substrate portion pressed by the first roller and elastically deformed.

The cut-face separating section may include: a first roller pressed upon the top surface of the first substrate portion and rolling thereon; and a second roller arranged so as to oppose the first roller with the first substrate portion therebetween and to oppose the cut face of the first substrate portion, a distance between a outer circumferential surface of the second roller and the first substrate portion gradually increasing from a cut face side of the first substrate portion toward a side of the first substrate portion opposite to the cut face side.

The size of a diameter of the outer circumferential surface of the second roller may gradually decrease from the cut face side of the first substrate portion toward the side of the first substrate portion opposite to the cut face.

A diameter of the outer circumferential surface of the second roller may be constant, and the second roller may be arranged such that the distance between the outer circumferential surface and the first substrate portion gradually increases from the cut face side of the first substrate portion toward the side of the first substrate portion opposite to the cut face.

The second roller may be arranged so as to be shifted behind the first roller with respect to a moving direction of the pressure.

The second belt conveyor mechanism may be arranged so as to be shifted behind the first belt conveyor mechanism with respect to a moving direction of the pressure.

The brittle material substrate cutting apparatus may further include a substrate holding section for holding the brittle material substrate.

The substrate holding section may be provided so as to be movable in a direction in which the cut-face separating section moves the brittle material substrate.

A brittle material substrate cutting method according to the present invention includes: a cutting step of cutting a brittle material substrate into a first substrate portion and a second substrate portion by applying a pressure in a vicinity of a scribe line having a vertical crack formed beforehand on a top surface of the brittle material substrate so as to extend the vertical crack to reach a bottom surface of the brittle material substrate, the pressure movable along and relative to the scribe line; and a cut-face separating step of contacting a top surface and a bottom surface of the first substrate portion and moving the first substrate portion in a direction to move away a cut face of the first substrate portion from a cut face of the second substrate portion.

The first substrate portion may be moved downward in the cut-face separating step.

A brittle material substrate cutting apparatus according to the present invention is a brittle material substrate cutting apparatus for moving parts to be pressed along a scribe line formed on a brittle material substrate beforehand and continuously cutting the brittle material substrate. The brittle material substrate cutting apparatus according to the present invention includes a cut-face separating section for separating cut faces of two newly-formed substrate portions after the cutting. Therefore, it is possible to prevent the cut faces from contacting each other, so that a surface defect (e.g., scratch, chipping or the like) on the cut faces is prevented and a brittle material product is also prevented from being contaminated with dust, a broken piece of the brittle material.

Further, the cut-face separating section moves one of the cut substrate portions in either an upper direction or a lower direction while the cut faces are separated from each other, so that it is possible to prevent the cut faces from contacting each other in an assured manner after the cut faces are separated.

BRIEF DESCRIPTION OF THE DRAWINGS

FIG. 4 is cross-sectional views showing a substrate holding break roller and a pressing break roller, respectively, included in the cutting apparatus shown in FIG. 1.

FIG. 12 is cross-sectional views showing a pressing roller and a tapered roller, respectively, each an example of the cut-face separating section included in the cutting apparatus shown in FIG. 11.

FIG. 16 is a diagram for describing a behavior of a substrate after it is cut by the conventional cutting apparatus shown in FIG. 14.

BEST MODE FOR CARRYING OUT THE INVENTION

Embodiment 1

Figure 1:
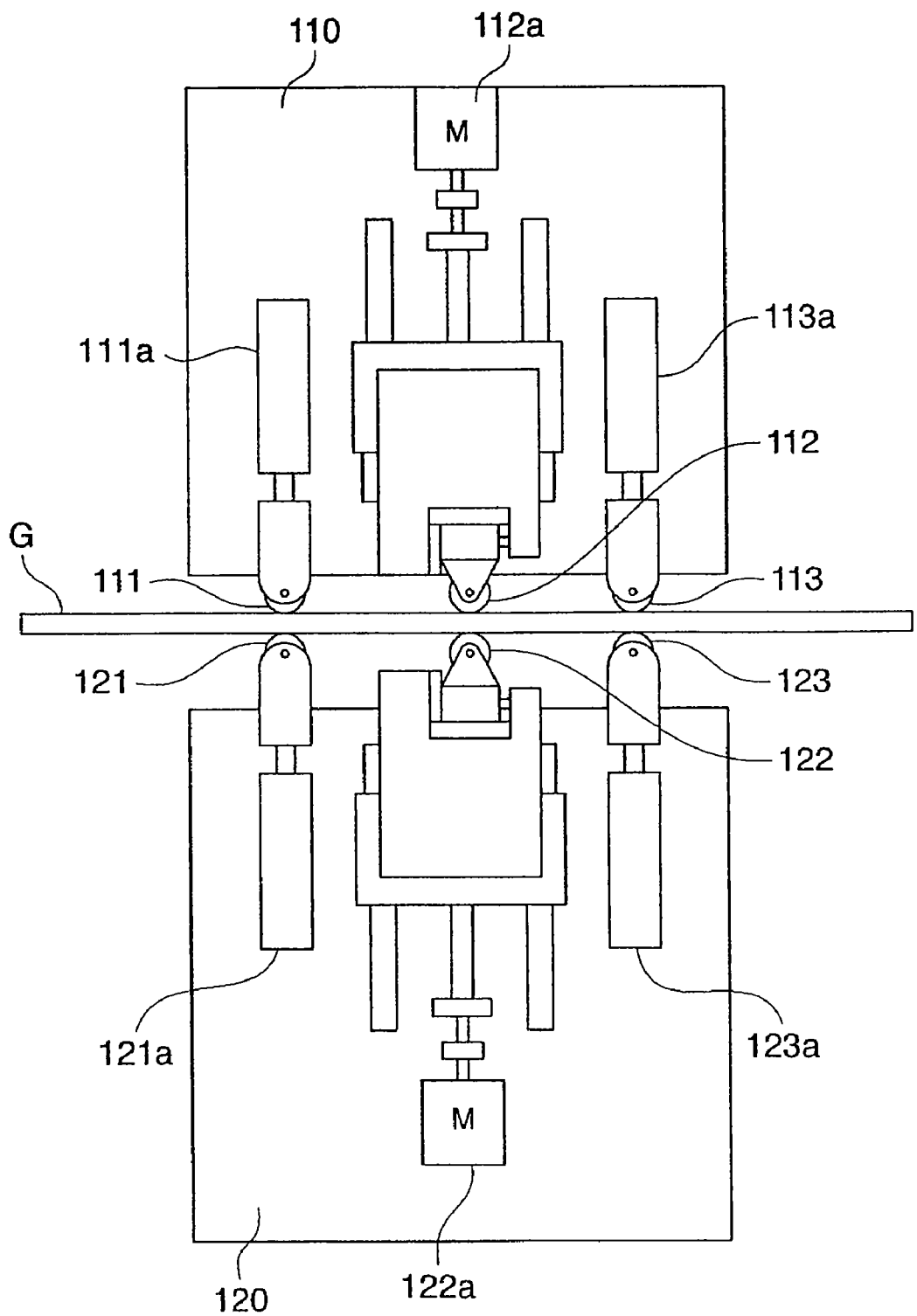
FIG. 1 is a diagram showing a configuration of a cutting apparatus according to Embodiment 1 of the present invention.

A cutting apparatus 1 according to Embodiment 1 of the present invention will be described with reference to FIG. 1. The cutting apparatus 1 shown in FIG. 1 is for performing a break step of cutting a substrate G with a scribe line formed thereon. The cutting apparatus 1 includes an upper roller holding section 110 and a lower roller holding section 120 arranged below the upper roller holding section 110. The substrate G is, for example, a brittle material substrate such as glass substrate, and the substrate G is mounted on a table 130 (see FIG. 5). The table 130 shown in FIG. 5 includes a plurality of table structuring members 130a, and the table 130 is a vacuum suctioning table functioning as a substrate holding section, wherein each of the plurality of table structuring members 130a is, for example, provided with a mechanism for holding the substrate G by vacuum-suction. The table 130 holds only side portions of the substrate G such that the lower roller holding portion 120 can pass through the table 130.

The upper roller holding section 110 and the lower roller holding section 120 are provided on a mount (not shown) or the like so as to reciprocate in +X direction and −X direction shown in FIG. 1 by a movement section (e.g., motor) (not shown). When the substrate G is cut, the upper roller holding section 110 and the lower roller holding section 120 are simultaneously moved in +X direction in an integrated manner.

A first auxiliary roller 111, a substrate holding break roller 112 and a first separating roller 113 are arranged in the upper roller holding section 110 in this order from the downstream side of +X direction (moving direction in the cutting), and they are aligned along +X direction. The first auxiliary roller 111, the substrate holding break roller 112 and the first separating roller 113 are held so as to be rotatable while they are energized downward by energizing/holding sections 111a, 112a and 113a, respectively. The energizing/holding sections 111a and 113a that energize/hold the first auxiliary roller 111 and the first separating roller 113 each include an air cylinder fixed to the upper roller holding section 110, and thus the energizing/holding sections 111a and 113a can adjust a downward energizing force to the first auxiliary roller 111 and the first separating roller 113, i.e., a pressing force to the substrate G, respectively. The energizing/holding section 112a for energizing/holding the substrate holding break roller 112 includes a motor M fixed to the upper roller holding section 110, and thus the energizing/holding section 112a can adjust a downward energizing force to the substrate holding break roller 112, i.e., a pressing force to the substrate G.

A second auxiliary roller 121, a pressing break roller 122 and a second separating roller 123 are provided in the lower roller holding section 120 and provided below the first auxiliary roller 111, the substrate holding break roller 112 and the first separating roller 113 so as to oppose the first auxiliary roller 111, the substrate holding break roller 112 and the first separating roller 113, respectively. The second auxiliary roller 121, the pressing break roller 122 and the second separating roller 123 are held so as to be rotatable while they are energized upward by energizing/holding sections 121a, 122a and 123a, respectively. The energizing/holding sections 121a and 123a that energize/hold the second auxiliary roller 121 and the second separating roller 123 each include an air cylinder fixed to the lower roller holding section 120, and thus the energizing/holding sections 121a and 123a can adjust an upward energizing force to the second auxiliary roller 121 and the second separating roller 123, i.e., a pressing force to the substrate G, respectively. The energizing/holding section 122a for energizing/holding the pressing break roller 122 includes a motor M fixed to the lower roller holding section 120, and thus the energizing/holding section 122a can adjust an upward energizing force to the pressing break roller 122, i.e., a pressing force to the substrate G.

As described above, the upper roller holding section 110 and the lower roller holding section 120 are moved in +X direction in an integrated manner in the break step. Accordingly, the rollers 111 to 113 and 121 to 123 and their respective energizing/holding sections 111a to 113a and 121a to 123a are moved in an integrated manner together with the movement of the upper roller holding section 110 and the lower roller holding section 120, and thus the first auxiliary roller 111 and the second auxiliary roller 121, the substrate holding break roller 112 and the pressing break roller 122, and the first separating roller 113 and the second separating roller 123 are rolled on the top surface and the bottom surface of the substrate G, respectively, in this order along the scribe line S formed on the substrate G.

Figure 3:
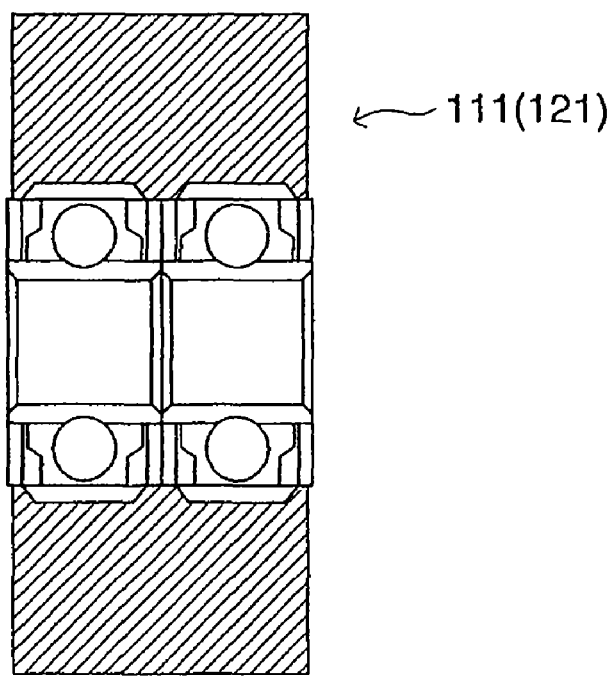
FIG. 3 is a cross-sectional view of a first auxiliary roller included in the cutting apparatus shown in FIG. 1.

The first auxiliary roller 111 and the second auxiliary roller 121 have the same shape. As shown in FIG. 3, the first auxiliary roller 111 has an outer circumferential surface thereof with a constant outer-diameter so as to be rollable on the scribe line formed on the substrate G and substrate portions located on both sides of the scribe line. Similar to the first auxiliary roller 111, the second auxiliary roller 121 has an outer circumferential surface thereof with a constant outer-diameter so as to be rollable on the bottom surface corresponding to the top surface of the substrate G where the first auxiliary roller 111 is rolled. The first auxiliary roller 111 and the second auxiliary roller 121 are made of hard rubber such as urethen or relatively hard material such as engineering plastic made of polyetheretherketone resin or the like. The first auxiliary roller 111 and the second auxiliary roller 121 are each attached, by a bearing, to a supporting shaft (not shown) horizontally provided at a lower portion of each of the respective energizing/holding sections 111a and 121a so that the first auxiliary roller 111 and the second auxiliary roller 121 are rotatable.

Portion (a) of FIG. 4 shows a cross-sectional view of the substrate holding break roller 112. The substrate holding break roller 112 is attached, by a bearing, to a supporting shaft (not shown) horizontally provided at a lower portion of the energizing/holding section 112a so that the substrate holding break roller 112 is rotatable. A V-shaped groove in a cross-sectional view is formed on an outer circumferential surface of the substrate holding break roller 112, and the outer circumferential surface of the substrate holding break roller 112 has a constant outer-diameter such that side edge portions on both sides of the substrate holding break roller 112 can roll on substrate portions on both sides of the scribe line S, wherein each of the substrate portions has a predetermined distance to the scribe line S.

Portion (b) of FIG. 4 shows a cross-sectional view of the pressing break roller 122. The pressing break roller 122 is attached, by a bearing, to a supporting shaft (not shown) horizontally provided at a lower portion of the energizing/holding section 122a so that the pressing break roller 122 is rotatable. A U-shaped groove is provided on the central portion of the pressing break roller 122 in its axial direction, and outer circumferential surfaces on both sides of the groove are protruded in a shape of circle. Side portions on both sides of the U-shaped groove of the pressing break roller 122 roll on portions adjacent to a portion on the bottom surface (the other side of the top surface) that corresponds to the scribe line S formed on the top surface of the substrate G. More specifically, the side portions on both sides of the U-shaped groove of the pressing break roller 122 roll on bottom surface portions corresponding to portions on the top surface which are more adjacent to the scribe line S than top surface portions of the substrate G where the side edge portions of the substrate holding break roller 112 positioned above roll. The pressing break roller 122 is, for example, made of hard rubber such as urethen or relatively hard material such as engineering plastic made of polyetheretherketone resin or the like.

Figure 2:
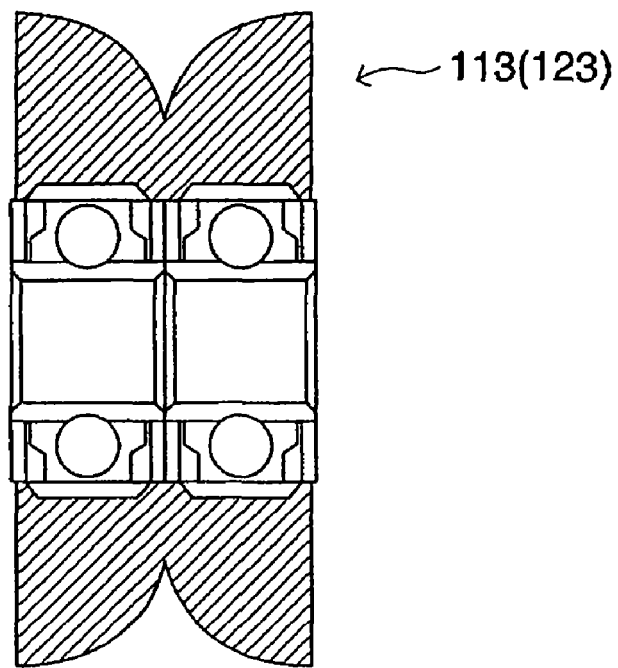
FIG. 2 is a cross-sectional view of a separating roller that is an example of a cut-face separating section included in the cutting apparatus shown in FIG. 1.

The first separating roller 113 and the second separating roller 123 are positioned on the opposite side with respect to the substrate holding break roller 112 and the pressing break roller 122 in +X direction, and the first separation roller 113 and the second separation roller 123 have the same shape. FIG. 2 shows a cross-sectional view of the first separating roller 113 and the second separating roller 123. The first separating roller 113 and the second separating roller 123 are each attached, by a bearing, to a supporting shaft (not shown) horizontally provided at a lower portion of each of the respective energizing/holding sections 113a and 123a so that the first separating roller 113 and the second separating roller 123 are rotatable.

A V-shaped groove is formed on an outer circumferential surface of each of the first separating roller 113 and the second separating roller 123. The size of the diameter at the central portion of each of the first separating roller 113 and the second separating roller 123 in its axial direction is the smallest. The size of the diameter sequentially increases toward the sides in the axial direction, and the size of the diameter of the side surface of each of the sides is the largest. The shape of the inclined outer circumferential surface in the cross-sectional view at the side portion of each of the first separating roller 113 and the second separating roller 123 in the axial direction is protruded in a circle. The first separating roller 113 and the second separating roller 123 are elastically deformable, and they are each made of material having a predetermined friction coefficient with respect to a surface of the substrate G, such as urethane rubber, in an integrated manner.

The side portions of each of the first separating roller 113 and the second separating roller 123 in its axial direction are elastically deformed so as to separate the portions on both sides of the scribe line formed on the top surface of the substrate G when the side portions of the first separating roller 113 and the second separating roller 123 are pressed upon the portions on both sides of the scribe line. The side portions of the first separating roller 113 and the second separating roller 123 exert a force such that the substrate portions located on both sides of the scribe line S are separated from each other due to the friction with the surfaces of the substrate G.

The first separating roller 113 and the second separating roller 123 shown in FIG. 2 each have the shape of the inclined outer circumferential surface in the cross-sectional view at the side portion thereof in the axial direction protruded in a circle. However, the first separating roller 113 and the second separating roller 123 can have a shape recessed in a circle or a shape inclined in a straight manner. In addition, the first separating roller 113 and the second separating roller 123 each can be formed of a pair of roller half-bodies in which the size of the diameter is gradually decreased from one side toward the other side in the axial direction, and the side surfaces of the roller half-bodies each having the smallest diameter can be adhered to each other.

The first separating roller 113 and the second separating roller 123, and the energizing/holding section 113a and the energizing/holding section 123a are each an example of the cut-face separating section for pressing the substrate G when the substrate G is cut and for separating cut faces B1 and B2 of the cut substrate portions G1 and G2 from each other. Other examples of the cut-face separating section will be described later.

In the break step in Embodiment 1, the upper roller holding section 110 and the lower roller holding section 120 are moved in +X direction. Alternatively, the table 130 is moved in −X direction so as to move the substrate G in −X direction. In addition, instead of moving the upper roller holding section 110 and the lower roller holding section 120 in an integrated manner by a movement section (e.g., motor), a rotation driving section for rotating the rollers 111 to 113 and 121 to 123 is provided to each of the roller 111 to 113 and 121 to 123 so as to move the substrate in −X direction or +X direction due to the rotation of each of the rollers by the rotation driving section.

Figure 5:
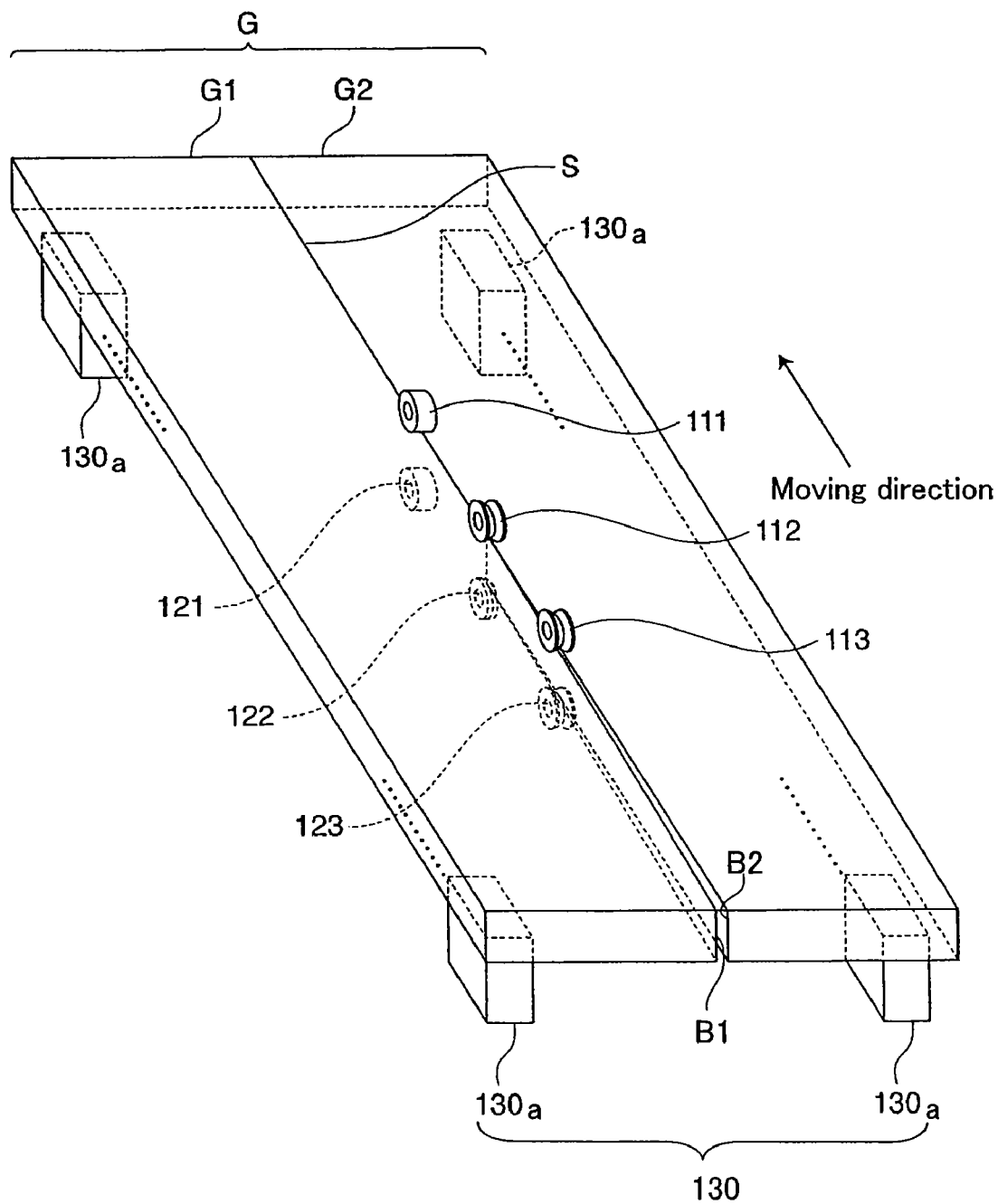
FIG. 5 is a schematic view for describing an operation of the cutting apparatus shown in FIG. 1.

FIG. 5 is a schematic view for describing an operation for performing the break step by the cutting apparatus 1. The brief of the operation of the break step performed by the cutting apparatus 1 is as follows. First, the substrate G is mounted on the table 130 such that the central position of each of the rollers 111 to 113 and 121 to 123 in its axial direction and the scribe line S formed on the substrate G are approximately aligned. The table 130 suctions and holds the substrate G via a method, for example, by vacuum-suction or the like. Next, the first auxiliary roller 111 and the second auxiliary roller 121 are moved by the respective energizing sections 111a and 121a to positions where the first auxiliary roller 111 and the second auxiliary roller 121 contact the top surface and the bottom surface of the substrate G, respectively, and held there. The substrate holding break roller 112 and the first separating roller 113 are held on the top surface of the substrate G where the substrate holding break roller 112 and the first separating roller 113 are pressed by the respective energizing/holding sections 112a and 113a with a predetermined pressure. The pressing break roller 122 and the second separating roller 123 are held on the bottom surface of the substrate G where the pressing break roller 122 and the second separating roller 123 are pressed by the respective energizing/holding sections 122a and 123a with a predetermined pressure.

In this state, the upper roller holding section 110 and the lower roller holding section 120 are moved along +X direction in an integrated manner. As such, the first auxiliary roller 111 contacts the scribe line S on the top surface of the substrate G, and the second auxiliary roller 121 contacts a portion on the bottom surface of the substrate G that corresponds to the scribe line S. When the first auxiliary roller 111 and the second auxiliary roller 121 are rolled on the top surface and the bottom surface of the substrate G, respectively, together with the movement of the upper roller holding section 110 and the lower roller holding section 120, the substrate holding break roller 112 and the pressing break roller 122 are rolled on the top surface and the bottom surface of the substrate G, respectively, with a predetermined pressing force. As a result, as will be described below, a vertical crack formed along the scribe line S extends downward by the substrate holding break roller 112 and the pressing break roller 122 to reach the bottom surface of the substrate G, so that the substrate G is cut into substrate portions G1 and G2 on both sides of the scribe line S. Thereafter, the first separating roller 113 is rolled on the top surface of the substrate G along the scribe line S while the second separating roller 123 is rolled on the bottom surface of the substrate G. The cut faces B1 and B2 of the substrate portions G1 and G2 are separated from each other by the first separating roller 113 and the second separating roller 123 in an assured manner.

Next, an operation of each of the rollers when the cutting apparatus 1 performs the break step will be described in detail. It should be noted that one of the portions of the substrate G with the scribe line S therebetween is referred to as substrate portion G1, and the other portion is referred to as substrate portion G2, as described above. The substrate portion G1 and the substrate portion G2 are sequentially cut together with the movement of the substrate holding break roller 112 and the pressing break roller 122.

The substrate holding break roller 112 and the pressing break roller 122 are rolled on the top surface and the bottom surface of the substrate G along the scribe line S formed on the substrate G while the substrate holding break roller 112 and the pressing break roller 122 press the top surface and the bottom surface of the substrate G with a predetermined pressure, respectively, in a state of opposing each other. In this case, the substrate holding break roller 112 presses portions on both sides of the scribe line S on the top surface of the substrate G, wherein each of the portions has a predetermined distance to the scribe line S, while the pressing break roller 122 presses portions on the bottom surface corresponding to portions on the top surface which are more adjacent to the scribe line S than the portions pressed by the substrate holding break roller 112. As such, the pressing break roller 122 pushes upward the portions on both sides of the scribe line S which adjacent to the scribe line S while the substrate holding break roller 112 pushes downward the portions on both sides of the scribe line S which are located beyond the portions on both sides of the scribe line S which are adjacent to the scribe line S and which are pushed upward. As a result, the vertical crack forming the scribe line S extends in a thickness direction of the substrate G. As such, the vertical crack reaches the bottom surface of the substrate G, and the substrate G is cut into the substrate portions G1 and G2.

The first auxiliary roller 111 and the second auxiliary roller 121 suppress a distortion of the substrate G before the cutting and prevent the vertical crack from extending in any directions other than a vertical direction.

When the substrate G is cut into the substrate portions G1 and G2 by the vertical crack, the first separating roller 113 and the second separating roller 123 move the cut substrate portions G1 and G2 in directions to separate the cut substrate portions G1 and G2 from each other, so that the cut faces B1 and B2 of the substrate portions G1 and G2 are separated from each other.

Figure 6:
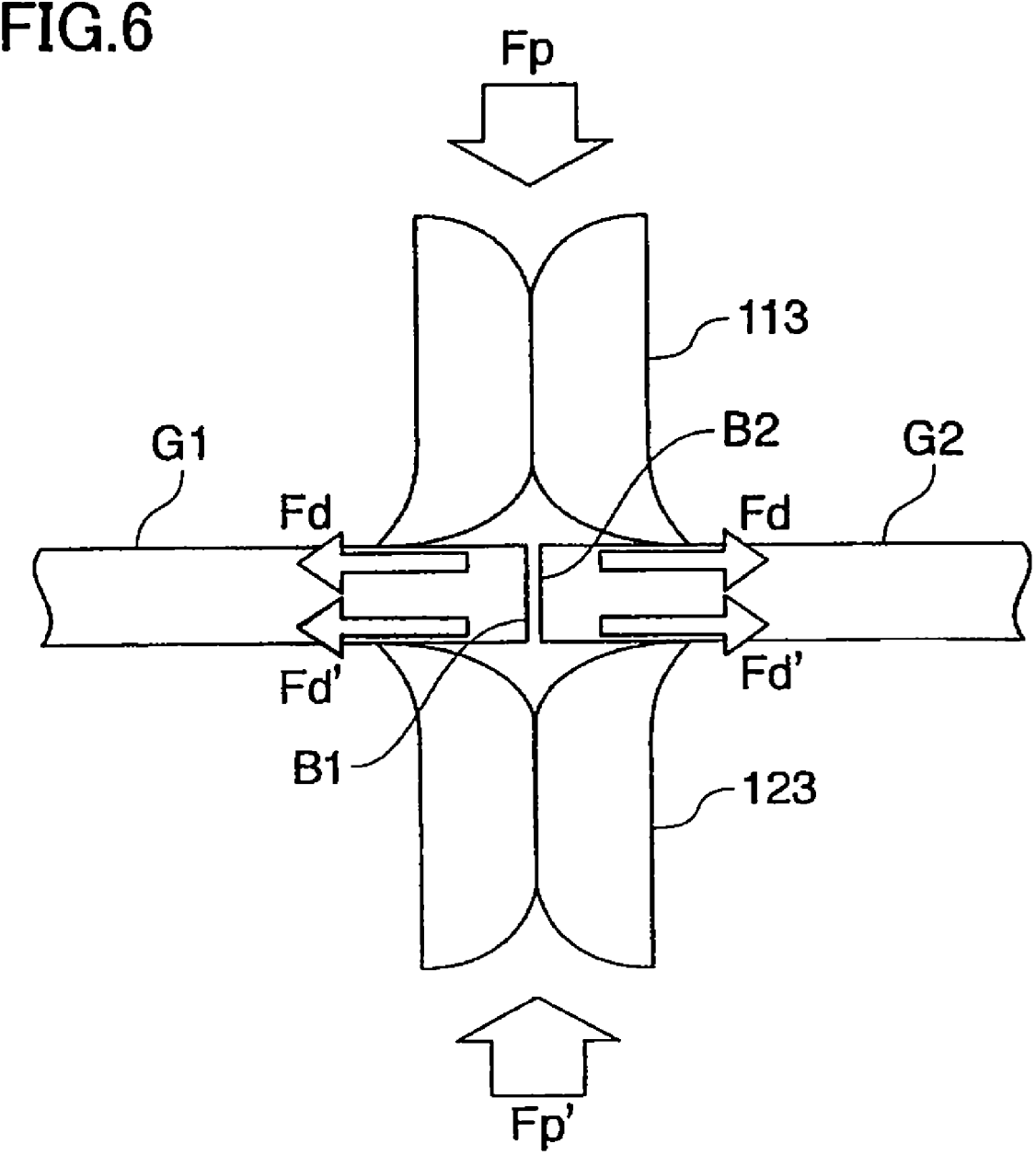
FIG. 6 is a schematic view for describing an operation of the first separating roller and the second separating roller shown in FIG. 2.

An operation of moving the substrate portions G1 and G2 by the first separating roller 113 and the second separating roller 123 in directions to separate the substrate portions G1 and G2 from each other will be described in detail with reference to FIG. 6. FIG. 6 is a cross-sectional view of the first separating roller 113 and the second separating roller 123 viewed from the upstream side of the moving direction of the first separating roller 113 and the second separating roller 123. Pressing forces Fp and Fp' applied upon the first separating roller 113 and the second separating roller 123 by the energizing/holding section 113*a* and the energizing/holding section 123*a*, respectively, and forces Fd and Fd' for separating the substrate portion G1 and the substrate portion G2 from each other by the first separating roller 113 and the second separating roller 123 are schematically shown by arrows. The first separating roller 113 and the second separating roller 123 are formed such that the size of the outer-diameter of each of the first separating roller 113 and the second separating roller 123 gradually increases from the central portion in its axial direction toward the side edge portions on both sides thereof, and the first separating roller 113 and the second separating roller 123 are elastically deformable. Thus, when the first separating roller 113 and the second separating roller 123 are pressed upon the top surface and the bottom surface of the substrate portions G1 and G2, respectively, by the pressing forces Fp and Fp', the pressed side edge portions on outer circumferential sides are elastically deformed in directions to separate the side edge portions from each other. Since the pressed side edge portions on both sides of the first separating roller 113 and the second separating roller 123 are elastically deformed in directions to separate the side edge portions from each other, the forces Fd and Fd' are affected on the substrate portions G1 and G2 in directions to separate the substrate portions G1 and G2 from each other. Since the first separating roller 113 and the second separating roller 123 have a predetermined friction coefficient with respect to the top surface and the bottom surface of the substrate G, respectively, the substrate portion G1 and the substrate portion G2 pressed by the first separating roller 113 and the second separating roller 123, respectively, with the forces Fd and Fd' are moved such that the cut faces B1 and B2 are separated from each other.

In this manner, the first separating roller 113 and the second separating roller 123 can affect, on the substrate portion G1 and the substrate portion G2, the forces Fd and Fd' for separating the cut faces B1 and B2 in directions to separate the cut faces B1 and B2 from each other, based on the pressing forces Fp and Fp' applied by the respective energizing/holding sections 113*a* and 123*a*. The magnitude of each of the pressing forces Fp and Fp' is appropriately set in accordance with the material of the first separating roller 113 and the second separating roller 123, the material of the substrate G to be cut or the like such that the first separating roller 113 and the second separating roller 123 are deformed so as to separate the cut faces B1 and B2 from each other.

In this case, it is preferable that portions of the table 130 for holding the substrate portion G1 and the substrate portion G2 are moved in directions to separate the portions of the table 130 from each other such that the table 130 does not prohibit the movement of separating the substrate portion G1 and the substrate portion G2 from each other. More specifically, it may be configured that the portions of the table 130 for holding the substrate portion G1 and the substrate portion G2 are provided so as to be parallel to the surface of the mounted substrate G and to be movable in a direction orthogonal to the scribe line, and the portions of the table 130 for holding the substrate portion G1 and the substrate portion G2 are moved together with the substrate portion G1 and the substrate portion G2 by the forces Fd and Fd' affected on the substrate portion G1 and the substrate portion G2 by the first separating roller 113 and the second separating roller 123, respectively.

In this case, it is preferable that the portions of the table 130 for holding the substrate portion G1 and the substrate portion G2 are each stopped at a predetermined position until the first separating roller 113 and the second separating roller 123 pass, and the portions of the table 130 for holding the substrate portion G1 and the substrate portion G2 are moved together with the substrate portion G1 and the substrate portion G2 when the first separating roller 113 and the second separating roller 123 pass. For this, it is configured, for example, that the table 130 holds the portions for holding the substrate portion G1 and the substrate portion G2 each at a predetermined position by a locking member or the like while the portions for holding the substrate portion G1 and the substrate portion G2 are each energized by an energizing section (e.g., elastic body, air-cylinder or the like) with a force smaller than the forces (forces Fd and Fd' in FIG. 6) for moving the substrate portion G1 and the substrate portion G2 by the first separating roller 113 and the second separating roller 123 until the first separating roller 113 and the second separating roller 123 pass, and the holding of the portions for holding the substrate portion G1 and the substrate portion G2 by locking members are cancelled when the forces Fd and Fd' in FIG. 6 are applied, and the portions for holding the substrate portion G1 and the substrate portion G2 are each moved in a predetermined direction. An electrical driving section can be used as an energizing section.

Alternatively, it may be configured that a movement section (e.g., air-cylinder) for moving the portions of the table 130 for holding the substrate portion G1 and the substrate portion G2 is provided, and the movement section is controlled in synchronization with the movement of the upper roller holding section 110 and the lower roller holding section 120, so that the portions of the table 130 for holding the substrate portion G1 and the substrate portion G2 are each held at a predetermined position before the passing of the first separating roller 113 and the second separating roller 123, and the portions of the table 130 for holding the substrate portion G1 and the substrate portion G2 are moved in directions to separate the cut faces B1 and B2 from each other after the passing of the first separating roller 113 and the second separating roller 123. In this case, positions of the upper roller holding section 110 and the lower roller holding section 120 or the like are detected, for example, and a movement section (e.g., air-cylinder) can be controlled based on a result of the detected positions. For example, when the moving section is an air-cylinder, the supply of compressed air to the air cylinder and the stop of supplying the compressed air to the air cylinder can be controlled with the switching of electromagnetic valve.

As described above, the first separating roller 113 and the second separating roller 123 included in the cutting apparatus 1 according to Embodiment 1 are arranged behind with respect to the moving direction of the substrate holding break roller 112 and the pressing break roller 122, and the side edge portions on both sides of each of the first separating roller 113 and the second separating roller 123 are pressed by the cut substrate portions G1 and G2, respectively, and deformed from the center of each of the first separating roller 113 and the second separating roller 123 in its axial direction outward of both of its sides. As such, the substrate portion G1 and the substrate portion G2 are moved from the center of each of the first separating roller 113 and the second separating roller 123 in its axial direction outward of both of its sides. Therefore, the first separating roller 113 and the second separating roller 123 are rolled on the substrate G together with the substrate holding break roller 112 and the pressing break roller 122 while the first separating roller 113 and the second separating roller 123 are pressed on the substrate G, so that the substrate portion G1 and the substrate portion G2 immediately after the cutting are moved in directions to separate the substrate portion G1 and the substrate portion G2 from each other, and the cut faces B1 and B2 are separated from each other.

Accordingly, the cut faces B1 and B2 of the brittle material substrate cut in the break step are prevented from contacting each other, and thus a damage or contamination on the cut faces B1 and B2 and the surfaces of the brittle material substrate due to the contact of the cut face B1 and the cut face B2 to each other can be prevented.

The cut-face separating section in Embodiment 1 includes the first separating roller 113 and the second separating roller 123 (see FIG. 2) each formed of a predetermined material in an integrated manner such that the size of the diameter of each of the first separating roller 113 and the second separating roller 123 gradually increases from the central portion in its axial direction toward the sides of each of the first separating roller 113 and the second separating roller 123. Alternatively, the first separating roller 113 and the second separating roller 123 may be configured such that the size of the diameter of each of the first separating roller 113 and the second separating roller 123 gradually decreases from one side in the axial direction toward the other side.

Figure 7:
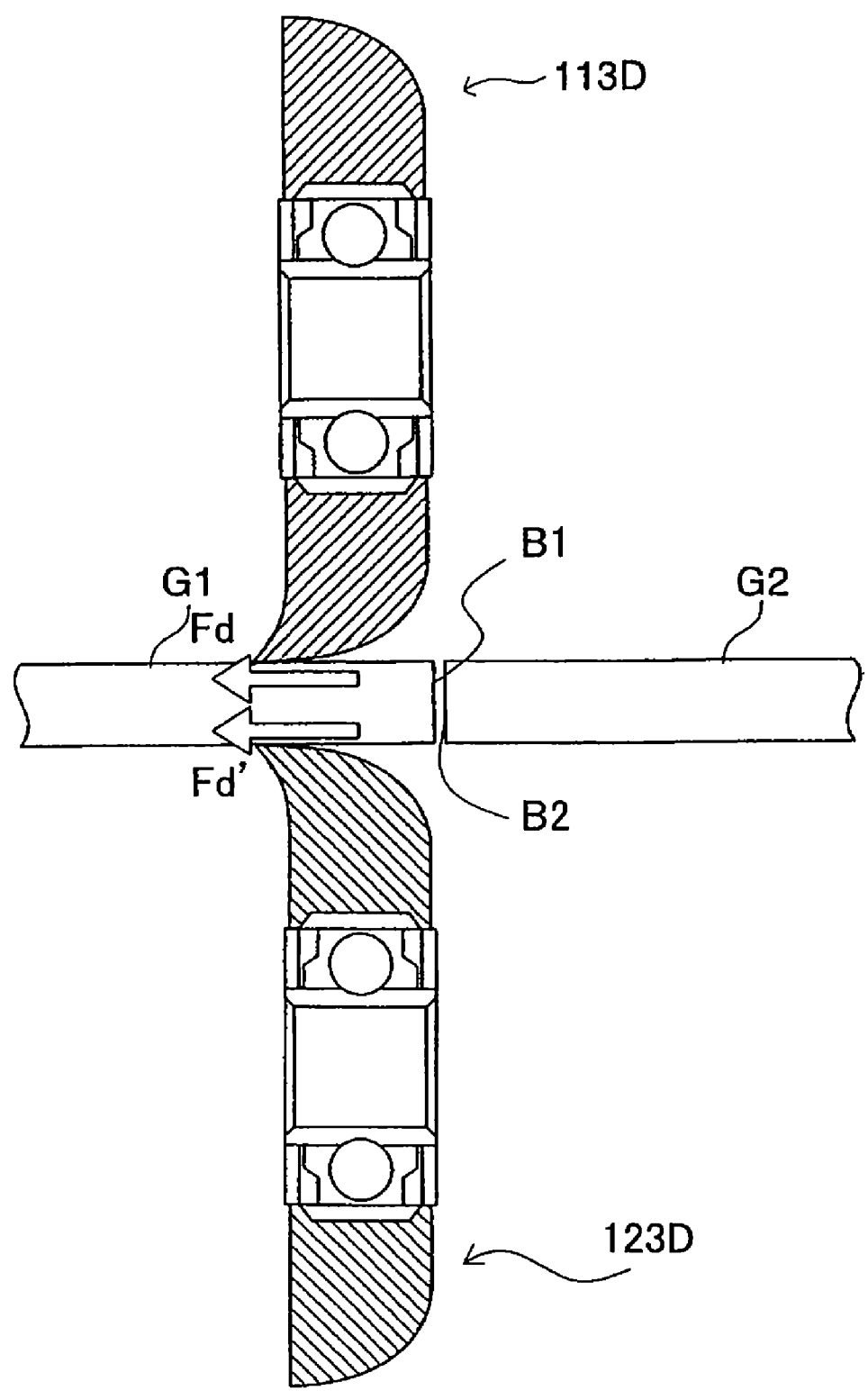
FIG. 7 is a diagram showing another example of the cut-face separating section included in the cutting apparatus shown in FIG. 1.

FIG. 7 is a cross-sectional view showing a first separating roller 113D and a second separating roller 123D having such a structure. Specifically, the first separating roller 113D and the second separating roller 123D each have a shape that the first separating roller 113 and the second separating roller 123 shown in FIG. 2 are each divided into two at the center in its axial direction.

The first separating roller 113D and the second separating roller 123D are arranged so as to oppose each other with the substrate G therebetween while one side surface of each of the first separating roller 113D and the second separating roller 123D having a small diameter is adjacent to the scribe line S. The pair of first separating roller 113D and second separating roller 123D is pressed on the substrate and moved along the scribe line S, so that the substrate portion G1 (one of the substrate portions) pressed by the pair of first separating roller 113D and second separating roller 123D can be moved in a direction to move away from the substrate portion G2 (the other of the substrate portions). In this case, it is preferable that the other substrate portion G2 which is not pressed by the pair of first separating roller 113D and second separating roller 123D is held by a table or the like such that the other substrate portion G2 does not move.

As another example of the cut-face separating section included in the cutting apparatus according to Embodiment 1, a first separating roller and a second separating roller may be each configured as an inclined roller having the axial direction thereof inclined at a predetermined angle with respect to the moving direction (+X direction) of the upper roller holding section 110 and the lower roller holding section 120.

Figure 8:
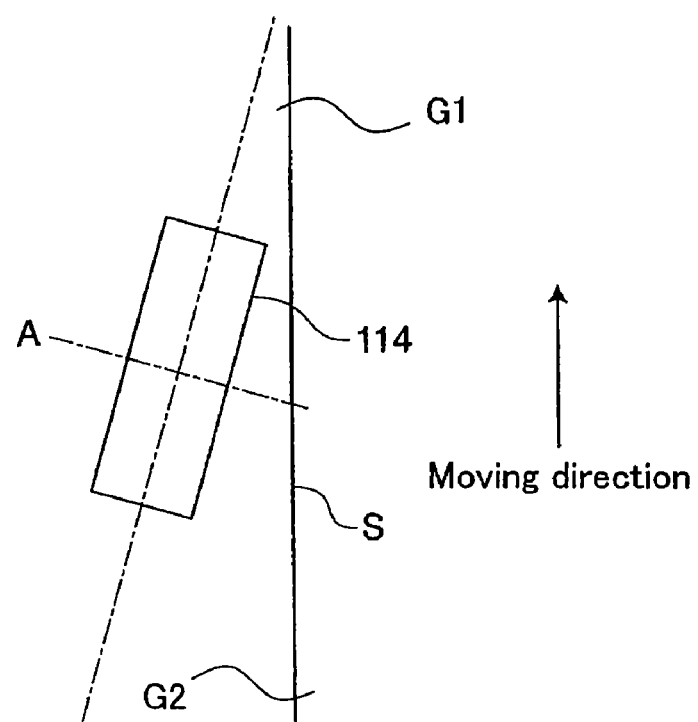
FIG. 8 is a diagram showing still another example of the cut-face separating section included in the cutting apparatus shown in FIG. 1.

A cut-face separating section including inclined rollers, as a first separating roller and a second separating roller, each having a rotation axis thereof inclined at a predetermined angle with respect to the moving direction will be described with reference to FIG. 8. FIG. 8 is a plan view schematically showing a positional relationship between the moving direction of an inclined roller 114 used for each of the first separating roller 113 and the second separating roller 123 and the rotation axis of the inclined roller 114. The rotation axis A of the inclined roller 114 shown in FIG. 8 is not orthogonal to the moving direction of the inclined roller 114 (i.e., +X direction in which the upper roller holding section 110 and the lower roller holding section 120 move) in the break step, and more specifically, the rotation axis of the inclined roller 114 is not orthogonal to the scribe line S. The inclined roller 114 is arranged such that a direction orthogonal to the rotation axis A of the inclined roller 114 intersects the scribe line S at an acute angle in front of the moving direction of the inclined roller 114 in the break step.

In a configuration using the inclined roller 114 for each of the first separating roller 113 and the second separating roller 123, inclined rollers 114 (first separating roller 113 and second separating roller 123) are pressed upon portions adjacent to the scribe line S on the top surface and the bottom surface of the substrate G, respectively, and moved along the scribe line S, so that the substrate portion G1 pressed by the inclined rollers 114 is moved in a direction to be separated from the other substrate portion G2.

The cut-face separating section is not limited to a configuration using one inclined roller 114 for each of the first separating roller 113 and the second separating roller 123, yet a configuration using a pair of inclined rollers 114 for each of the first separating roller 113 and the second separating roller 123 can be used. In this case, the pair of inclined rollers 114 used as each of the first separating roller 113 and the second separating roller 123 is arranged so as to be symmetrical with respect to the scribe line S while the pair of inclined rollers 114 is inclined with respect to the scribe line S. Alternatively, instead of using a configuration in which the pair of inclined rollers 114 is arranged so as to be symmetrical with respect to the scribe line S, a pair of separating rollers may be configured using an inclined roller 114 and a separating roller 113D having the sectional-view thereof shown in FIG. 7.

As described above, even by using the inclined rollers 114 for the first separating roller 113 and the second separating roller 123 while the rotation axis of the inclined rollers 114 is not orthogonal to the moving direction and the rolling direction of the inclined roller 114 is inclined with respect to the moving direction, it is possible to separate the substrate portion G1 pressed by the inclined rollers 114 from the other substrate portion G2.

The inclination angle of the rotation axis A of the inclined roller 114 with respect to the scribe line S is set such that a force for moving the substrate portion G1 pressed by the inclined roller 114 to be separated from the other substrate portion G2 is applied, and the inclination angle is appropriately changed according to the material of the substrate G or the like.

In addition, the material of the inclined roller 114 is required to have a friction coefficient with respect to the substrate G such that when pressed upon the substrate G, a force for separating the pressed substrate portion G1 from the other substrate portion G2 is applied, and hard rubber such as urethen is used for the material of the inclined roller 114, for example. In addition, the outer-diameter of the outer circumferential surface of the inclined roller 114 contacting the substrate G can be constant, or the outer-diameter of the outer circumferential surface can be changed in the axial direction. The outer circumferential surface can be, for example, the same shape as the outer circumferential surface of the separating roller 113D shown in FIG. 7. In this case, the inclined roller 114 is pressed upon the substrate portion G1 and elastically deformed, so that the inclined roller 114 can move the pressed substrate portion G1 in a more assured manner.

Figure 9:
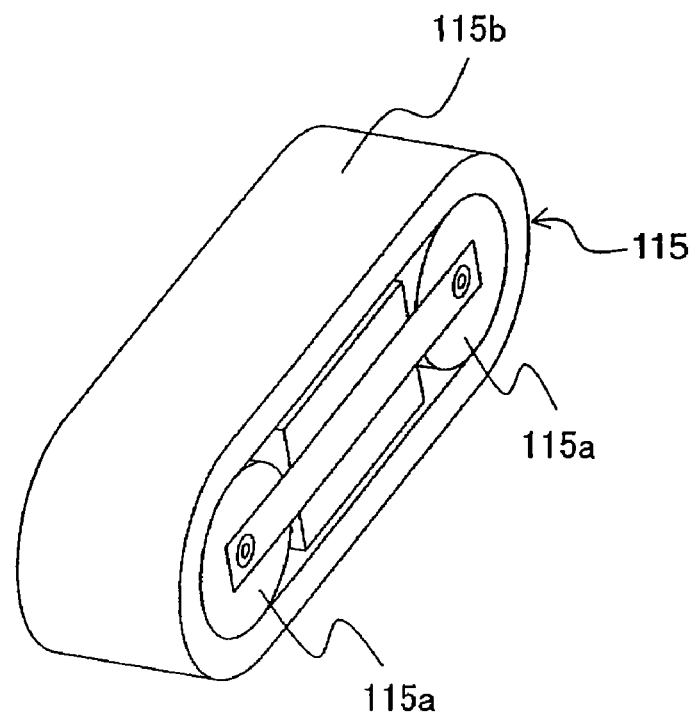
FIG. 9 is a diagram showing still another example of the cut-face separating section included in the cutting apparatus shown in FIG. 1.

In addition, as another example of the cut-face separating section in the cutting apparatus according to Embodiment 1, a belt conveyor mechanism 115 having a ring belt 115b wound around a plurality of wheels 115a can be used in place of each of the first separating roller 113 and the second separating roller 123, as shown in FIG. 9.

The belt conveyor mechanism 115 used for the cut-face separating section will be described with reference to FIG. 9. For example, it is configured that no driving apparatus is provided in the belt conveyor mechanism 115, and thus each wheel 115a can freely rotate. The belt conveyor mechanism 115 uses, for example, a belt 115b that is elastically deformable and has a predetermined friction coefficient with respect to the substrate G. A pair of belt conveyor mechanisms 115 is arranged so as to oppose each other with the substrate G therebetween while the thickness at the central portion of the belt 115b in its width direction in the cross-sectional view is thin and the thickness increases toward side edge portions on both sides of the belt 115b. The belt conveyor mechanisms 115 are each arranged such that the central portion of each of the belts in the width direction is along the scribe line S. As such, the side edge portions of each of the belts in the pair of belt conveyor mechanisms 115 are pressed upon the top surface and the bottom surface of the substrate G, respectively, and elastically deformed, and in such a state, the belts 115b are circled while contacting the top surface and the bottom surface of the substrate G, respectively, so that the side edge portions of each of the belts 115b opposing each other in an upper and lower direction are moved to separate the pressed substrate portions G1 and G2 from each other.

Alternatively, the belt 115b that is elastically deformable and has a predetermined friction coefficient with respect to the substrate G is used, and a pair of belt conveyor mechanisms 115 is arranged so as to oppose each other with the substrate G therebetween while the thickness of the belt 115b in the cross-sectional view gradually increases from one side edge portion toward the other side edge portion. The belt conveyor mechanisms 115 are each arranged such that the thin side edge portion (one side edge portion) of each of the belts 115b is along the scribe line S. Also in this case, the side edge portions of each of the belts 115b in the pair of belt conveyor mechanisms 115 are pressed upon the top surface and the bottom surface of the substrate G, respectively, and elastically deformed, and in such a state, the belts 115b are circled while contacting the top surface and the bottom surface of the substrate G, respectively, so that the side edge portions of the belts 115b opposing each other in the upper and lower direction are moved to separate the pressed substrate portion G1 from the substrate portion G2.

Further, the rotation axis of each of the wheels 115a having the belt 115b wound therearound in the pair of belt conveyor mechanisms 115 in the upper and lower direction is inclined with respect to the scribe line S while the pair of belt conveyor mechanisms is inclined with respect to the scribe line S such that a direction orthogonal to the rotation axis of the wheel 115 intersects the scribe line S at an acute angle in front of the moving direction of the pair of belt conveyor mechanisms 115 in the break step. As such, the belts 115b are circled while pressed upon the top surface and the bottom surface of the substrate G, respectively, so that the belts 115b are moved to separate the pressed substrate portion G1 from the substrate portion G2.

In this case, another pair of belt conveyor mechanisms 115 can be further provided in which belts 115b is pressed upon the top surface and the bottom surface of the other substrate portion G2, respectively. Alternatively, separating rollers 113D having the cross-sectional view thereof shown in FIG. 7 can be pressed upon the top surface and the bottom surface of the other substrate portion G2, respectively, or inclined rollers 114 shown in FIG. 8 can be pressed upon the top surface and the bottom surface of the other substrate portion, respectively.

Embodiment 2

The cut-face separating section included in the cutting apparatus according to Embodiment 1 of the present invention described above moves the substrate portions cut in the break step in directions to separate the substrate portions from each other while cut-face separating section included in a cutting apparatus according to Embodiment 2 is characterized by moving one of cut substrate portions in an upper and lower direction, in addition to the feature of Embodiment 1.

Figure 10:
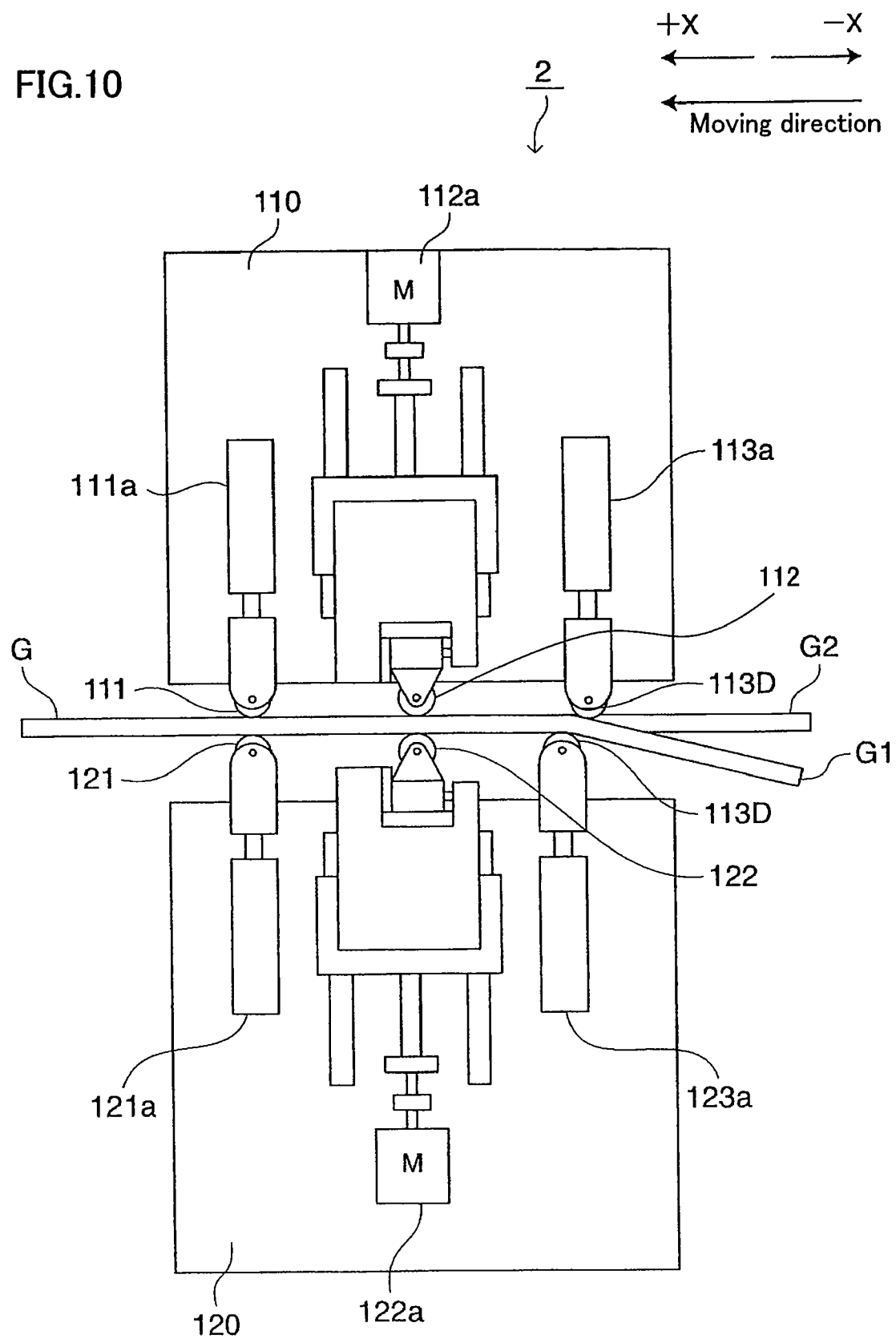
FIG. 10 is a diagram showing a configuration of a cutting apparatus according to Embodiment 2 of the present invention.

A cutting apparatus 2 according to Embodiment 2 shown in FIG. 10 uses separating first rollers 113D (cross-sectional view thereof shown in FIG. 7) in place of the first separating roller 113 and the second separating roller 123 in the cutting apparatus 1 according to Embodiment 1 shown in FIG. 1. The first separating roller 113D arranged above the substrate G and the second separating roller 113D arranged below the substrate G are arranged on the same side (which corresponds to the substrate portion G1 which is provided in the front in FIG. 10) with respect to the scribe line S. The first separating roller 113D is positioned behind the second separating roller 113D with respect to the moving direction of the cutting apparatus 2. More specifically, the position of the rotation axis of the first separating roller 113D held by the upper roller holding section 110 via the energizing section 113a is arranged behind the position of the rotation axis of the second separating roller 113D with respect to the moving direction of the cutting apparatus 2 (−X direction) having a distance of less than the diameter of each of the separating rollers 113D separated from each other. The other structures in the cutting apparatus 2 are similar to those in the cutting apparatus 1. Therefore, the structures are denoted by the same reference numerals, and thus the description thereof will be omitted herein.

Since the position of the rotation axis of the first separating roller 113D arranged above the substrate G is arranged behind the position of the rotation axis of the second separating roller 113D arranged below the substrate G with respect to the moving direction, a portion of the substrate portion G1 located between both separating rollers 113D is pressed downward by the first separating roller 113D, and the substrate that is located behind the midpoint of parts contacted by the first and second separating rollers 113D, respectively, is positioned below the midpoint, and thus the substrate behind the midpoint is inclined. As such, the cut substrate portion G1 pressed by both separating rollers 113D is moved in a direction to separate the cut face B1 from the cut face B2 of the other substrate portion G2, and at the same time, the cut substrate portion G1 is moved such that it inclines below the other substrate portion G2.

In Embodiment 2, it is preferable that the table 130 (see FIG. 5) suctions and holds only the substrate portion G2. In this case, the substrate portion G1 is moved downward by the first separating roller 113D, and the substrate portion G1 drops below after the separation.

Alternatively, the substrate portion G1 can be suctioned and held by the table 130 as well. In this case, it is preferable that the table 130 for holding the substrate portion G1 can be moved in the lower direction as well as in the direction along the surface of the substrate G. With the table having such a structure, there is no concern of preventing the substrate portion G1 from moving downward when the substrate portion G1 is moved in a direction to be separated from the other substrate portion G2.

As described above, according to the cutting apparatus 2 of Embodiment 2, while the cut faces B1 and B2 of the substrate portions G1 and G2 are moved to separate the cut faces B1 and B2 from each other by the first and second separating rollers 113D, positions of the cut substrate portions G1 and G2 in the upper and lower direction are shifted, respectively. Thus, it is possible to prevent the cut faces B1 and B2 of the substrate portions G1 and G2 from contacting each other in an assured manner. In addition, even if the substrate portion G1 is moved in a direction to approach the substrate portion G2 after the passing of the first separating roller 113D, it is possible to prevent the cut faces B1 and B2 from contacting from each other in an assured manner since the cut faces B1 and B2 are each shifted, respectively, in the upper and lower direction.

In the cutting apparatus 2 according to Embodiment 2 described above, another separating roller can be additionally arranged such that the substrate portion G2 is moved only in a direction to be separated from the cut face of the other substrate portion G1 without moving the substrate portion G2 in the upper and lower direction with pressure.

In addition, the cut-face separating section according to Embodiment 2 uses the pair of first and second separating rollers 113D (cross-sectional view thereof shown in FIG. 7). Alternatively, a pair of inclined rollers 114 having the shape thereof shown in FIG. 8 can be used. Still alternatively, a pair of belt conveyor mechanisms 115 having the shape thereof shown in FIG. 9 can be used. Still alternatively, a pair selected from the group of separating roller 113D (cross-sectional view thereof shown in FIG. 7), inclined roller 114 having the shape thereof shown in FIG. 8 and belt conveyor mechanism 115 having the shape thereof shown in FIG. 9 can be used.

Embodiment 3

The cut-face separating sections included in the cutting apparatuses according to Embodiments 1 and 2 of the present invention described above have structures that the rollers or belts contacting the substrate are deformed, or the rotation axis is inclined with respect to the moving direction, so that the substrate portions cut in the break step are separated from each other. Instead thereof, a cut-face separating section included in a cutting apparatus according to Embodiment 3 is characterized by moving cut substrate portions by controlling the position of one of the cut substrate portions using a roller for pressing a surface of the substrate G and a roller having an inclined outer circumferential surface with the outer-diameter thereof gradually decreased along its axial direction to hold one of the cut substrate portions therebetween.

Figure 11:
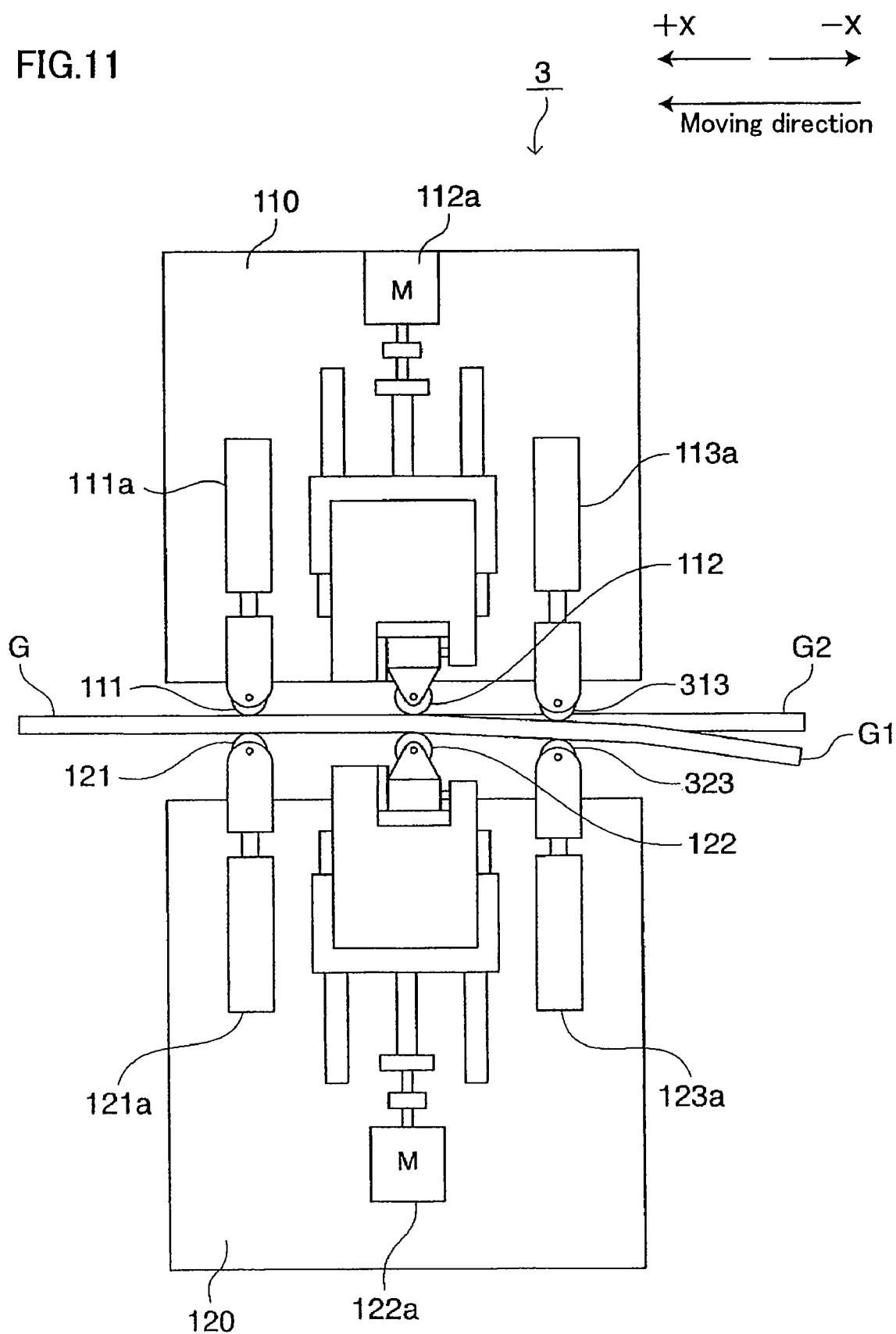
FIG. 11 is a diagram showing a configuration of a cutting apparatus according to Embodiment 3 of the present invention.

In a cutting apparatus 3 according to Embodiment 3 shown in FIG. 11, the first separating roller 113 and the second separating roller 123 in the cutting apparatus 1 according to Embodiment 1 shown in FIG. 1 are replaced with a pressing roller 313 shown in Portion (a) of FIG. 12 and a tapered roller 323 shown in Portion (b) of FIG. 12, respectively. The pressing roller 313 and the tapered roller 323 are arranged in an upper and lower direction so as to oppose each other with one substrate portion G1 therebetween. The other structures in the cutting apparatus 3 are similar to those in the cutting apparatus 1. Therefore, the structures are denoted by the same reference numerals, and thus the description thereof will be omitted herein.

The outer-diameter of the pressing roller 313 shown in Portion (a) of FIG. 12 is constant in its axial direction, and the outer circumferential surface of the pressing roller 313 is formed as a flat plane parallel to its rotation axis. The shape of the pressing roller 313 is not limited to this. As long as the pressing roller 313 is pressed upon a surface of the substrate portion G1 so as to press the substrate portion G1 downward, the shape of the pressing roller 313 can be arbitrary. The pressing roller 313 is, for example, made of hard rubber such as urethen, engineering plastic made of polyetheretherketone resin, metal or the like.

The tapered roller 323 shown in Portion (b) of FIG. 12 is a roller formed such that the diameter thereof gradually decreases from one side toward the other side, that is, the outer circumferential surface of the tapered roller 323 in the cross-sectional view is tapered. One side surface having the diameter thereof larger than that of the other side surface is referred to as major-diameter surface 323L, and the other side surface is referred to as minor-diameter surface 323S. The tapered roller 323 is, for example, made of engineering plastic made of polyetheretherketone resin, metal or the like. Portion (a) and (b) of FIG. 12 describe bearings used in order to support the pressing roller 313 and the tapered roller 323 such that the pressing roller 313 and the tapered roller 323 are rotatable.

Figure 13:
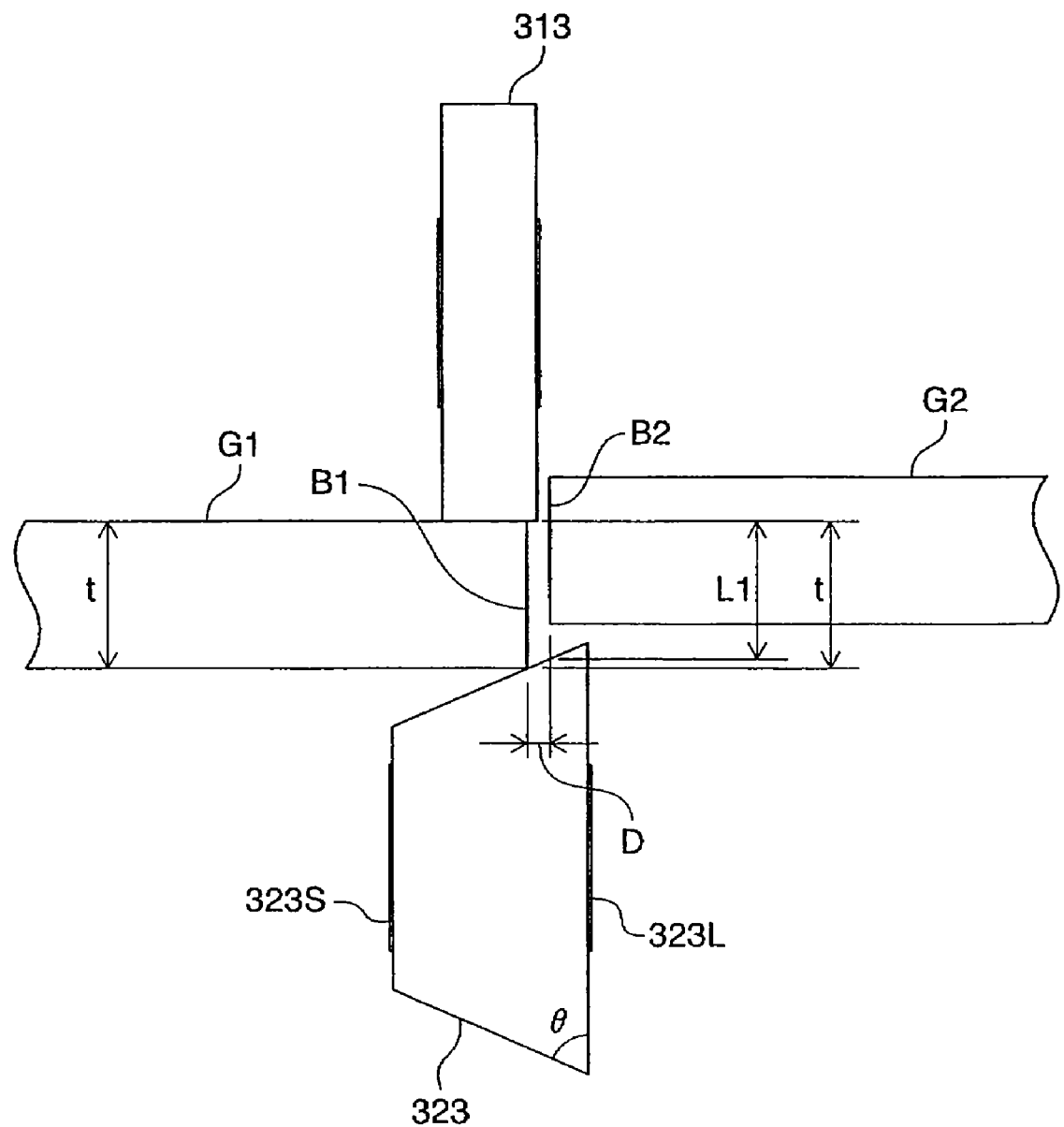
FIG. 13 is a diagram for describing an arrangement and an operation of the cut-face separating section included in the cutting apparatus shown in FIG. 11.
Figure 14:
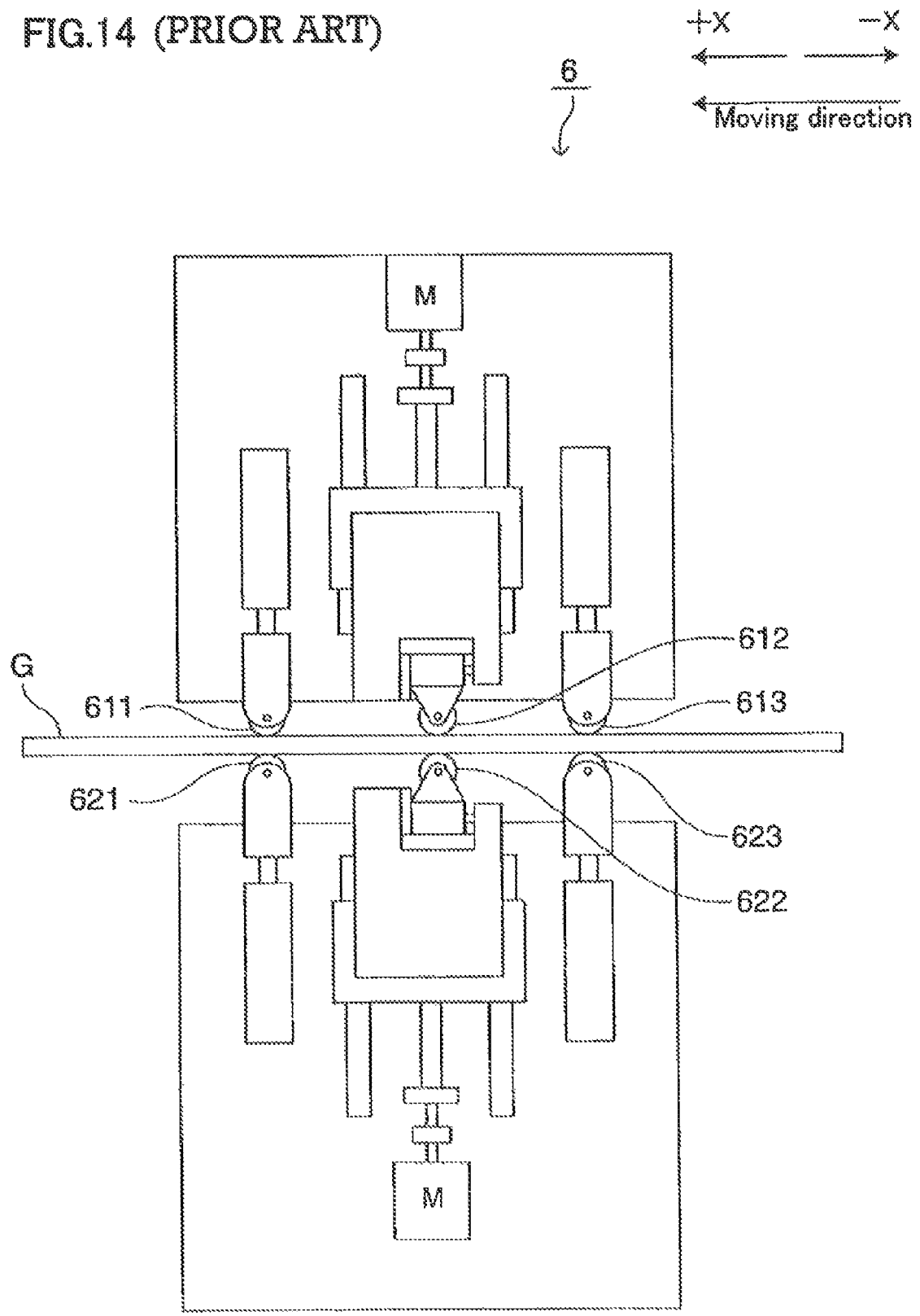
FIG. 14 is a diagram showing a configuration of a conventional cutting apparatus.
Figure 15:
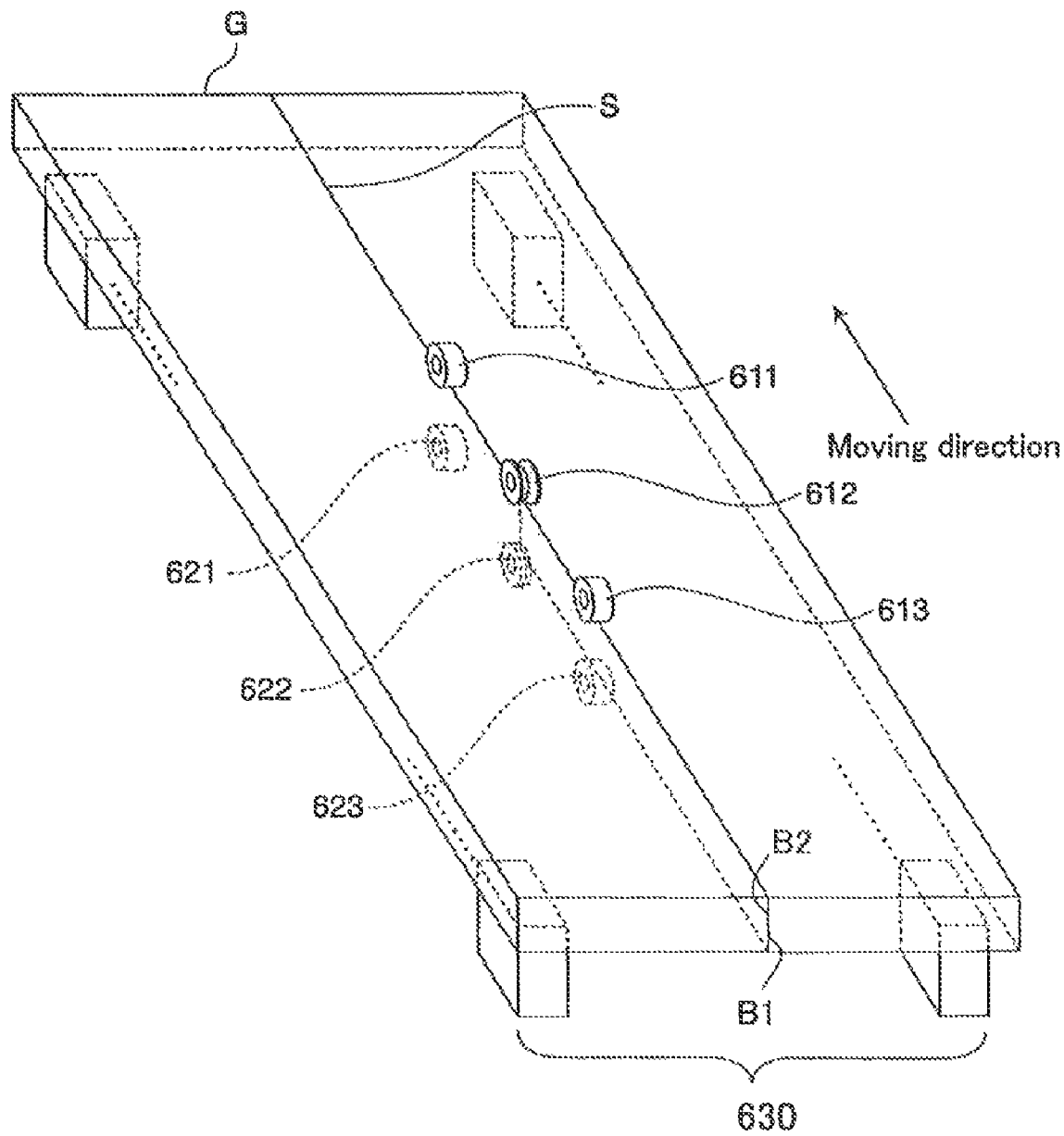
FIG. 15 is a schematic view for describing an operation of the conventional cutting apparatus shown in FIG. 14.

Next, an arrangement of the pressing roller 313 and the tapered roller 323, and an operation for moving the substrate portion G1 such that the cut faces B1 and B2 of the substrate portions G1 and G2 in the break step are separated from each other will be described with reference to FIG. 13. FIG. 13 is a cross-sectional view, viewed from the moving direction of the pressing roller 313 in the break step. FIG. 13 shows positions of the pressing roller 313 and the tapered roller 323, and the cut faces B1 and B2 of the substrate portions G1 and G2 are separated from each other by the pressing roller 313 and the tapered roller 323.

The tapered roller 323 is arranged such that the outer circumferential surface of the tapered roller 323 is positioned below the cut face B1 of the one substrate portion G1 and the major-diameter surface 323L is more adjacent to the other substrate portion G2 than the minor-diameter surface 323S is. More specifically, the tapered roller 323 is arranged such that the major-diameter surface 323L is positioned below the other substrate portion G2 and the minor-diameter surface 323S is positioned below the one substrate portion G1. With such an arrangement, a lower end portion of the cut face B1 of the one substrate G1 pressed downward by the pressing roller 313 contacts the outer circumferential surface of the tapered roller 323 in an assured manner.

It is preferable that the pressing roller 313 is arranged adjacent to the scribe line S such that the outer circumferential surface of the pressing roller 313 contacts the surface of the one substrate portion G1, but does not contact the other substrate portion G2. Since the major-diameter surface 323L of the tapered roller 323 is positioned below the other substrate portion G2, the distance between the outer circumferential surface of the tapered roller 323 immediately below the cut face B2 of the other substrate portion G2 and a lower end of a side surface of the pressing roller 313 adjacent to the scribe line S in the upper and lower direction is smaller than the thickness t of the substrate G (distance L1).

When the pressing roller 313 and the tapered roller 323 are arranged in this manner, the one substrate portion G1 held between the pressing roller 313 and the tapered roller 323 is pressed downward by the pressing roller 313 and then pressed upon the outer circumferential surface of the tapered roller 323. In this case, when a corner portion of the lower end portion of the cut face B1 of the one substrate portion G1 is pressed upon the outer circumferential surface of the tapered roller 323, the pressed corner portion is slid toward the minor-diameter 323S side of the tapered roller 323, and then moved to an outer circumferential surface position of the tapered roller 323 where the distance between the outer circumferential surface position and the pressing roller 313 in the upper and lower direction becomes the thickness t of the substrate G, since the distance between the outer circumferential surface position of the tapered roller 323 immediately after being pressed by the corner portion and the pressing roller 313 in the upper and lower direction is smaller than the thickness t of the substrate G (distance L1).

As a result, the cut face B1 of the one substrate portion G1 is separated from the cut face B2 of the other substrate portion G2. Although the separation distance D between the cut face B1 of the one substrate portion G1 and the cut face B2 of the other substrate portion G2 may slightly change due to an inclination of the one substrate portion G1 or the like, the separation distance D is defined by the following expression (1)

$$D = (t - L1) \tan \theta \quad (1)$$

where the inclination angle of the outer circumferential surface of the tapered roller 323 is $\theta$, the thickness of the one substrate portion G1 is t, and the distance between both rollers is L1.

Therefore, according to the cut-face separating section in the cutting apparatus 3 according to Embodiment 3, the separation distance D between the one substrate portion G1 and the other substrate portion G2 can be defined by shapes and arrangements of the pressing roller 313 and the tapered roller 323. Thus, it is possible to separate the cut faces B1 and B2 of the cut substrate portions G1 and G2 from each other in a more assured manner.

In Embodiment 3, it is preferable to hold the substrate portion G2 in a fixed manner such that the substrate portion G2 does not move in an upper and lower direction or in a horizontal direction. For this, the substrate portion G2 is suctioned and held by a table (not shown) or the like. Alternatively, another roller is additionally provided above the outer circumferential portion of the major-diameter surface 323L of the tapered roller 323, and the position of the substrate portion G2 is controlled by holding the substrate portion G2 with the outer circumferential portion of the major-diameter surface 323L of the tapered roller 323 and the other roller provided thereabove. Thus, it is possible to separate the cut faces B1 and B2 of the cut substrate portions G1 and G2 from each other in a more assured manner.

Engineering plastic, metal or the like is referred to as an example of a member forming the tapered roller 323. However, if the one substrate portion G1 contacting the tapered roller 323 is an unnecessary end portion or the like, it is preferable to make the tapered roller 323 with metal such as stainless steel, for example, due to the priority of the durability of the tapered roller 323 since there is no concern even if the substrate portion G1 is damaged. In this case, in order to prevent the outer circumferential portion of the major-diameter surface 323L from contacting and thus damaging the other substrate portion G2, it is possible to provide, for example, a member such as rubber, engineering plastic or the like along the outer circumferential portion of the major-diameter surface 323L such that the other substrate portion G2 is not damaged.

In addition, when the one substrate portion G1 contacting the tapered roller 323 is used as a product, it is preferable to use a relatively soft member such as engineering plastic or the like for the tapered roller 323 in order to prevent an damage on an end face of the substrate portion G1. In addition, in any case, plating or coating is provided on a surface of a material, so that a desired hardness and durability can be provided with the material.

In place of the tapered roller 323 described above, a roller having an outer circumferential surface thereof parallel to its axial direction can be provided and inclined with respect to a surface of the substrate G.

A cutting apparatus according to the present invention can be applied to the cutting of, for example, a liquid crystal panel, a plasma display panel, an organic electroluminescence (EL) panel, an inorganic EL panel, a transmissive projector panel and a reflective projector panel, all of which are a type of flat display panel.

Further, a cutting apparatus according to the present invention can be applied to the cutting of, for example, a single substrate (e.g., glass substrate, quartz substrate, sapphire substrate, semiconductor substrate, ceramic substrate, solar cell substrate, liquid crystal display panel, organic EL panel, inorganic EL panel, transmissive projector panel, reflective projector panel). Further, the cutting apparatuses according to the present invention can be applied to the cutting of a bonded substrate for which a plurality of substrates is bonded to each other.

INDUSTRIAL APPLICABILITY

A cutting apparatus according to the present invention separates cut faces generated in a continuous manner in a break step of continuously cutting a brittle material substrate with a scribe line formed thereon such that the cut faces do not contact each other. Thus, it is possible to prevent the manufacturing of a substrate portion having a poor quality due to a scratch, a chipping or the like resulting from the contact of the cut faces of the brittle material substrate when the substrate is cut.

The invention claimed is:

1. A brittle material substrate cutting apparatus, comprising:
  a cutting section for cutting a brittle material substrate into a first substrate portion and a second substrate portion by applying a pressure in a vicinity of a scribe line having a vertical crack formed beforehand on a top surface of the brittle material substrate so as to extend the vertical crack to reach a bottom surface of the brittle material substrate, the pressure movable along and relative to the scribe line; and
  a cut-face separating section for contacting a top surface and a bottom surface of the first substrate portion and moving the first substrate portion in a direction to move away a cut face of the first substrate portion from a cut face of the second substrate portion, wherein the cut-face separating section includes:
  a first roller for generating a force to separate the first substrate portion from the second substrate portion by rolling of the first roller on the top surface of the first substrate portion while pressed upon the top surface of the first substrate portion and elastically deformed; and
  a second roller, arranged so as to oppose the first roller with the first substrate portion therebetween, for generating a force to separate the first substrate portion from the second substrate portion by rolling of the second roller on the bottom surface of the first substrate portion while pressed upon the bottom surface of the first substrate portion and elastically deformed, wherein a size of a diameter of each of the first roller and the second roller in its axial direction gradually increases from one side thereof toward the other side, and a portion of each of the first roller and the second roller having a small diameter that is arranged so as to be adjacent to the cut face.

2. A brittle material substrate cutting apparatus according to claim 1, wherein the cut-face separating section includes:
  a first roller, arranged such that a direction orthogonal to a rotation axis of the first roller intersects the scribe line at an acute angle in front of a moving direction of the pressure, for generating a force to separate the first substrate portion from the second substrate portion by rolling of the first roller on the top surface of the first substrate portion; and
  a second roller, arranged so as to oppose the first roller with the first substrate portion therebetween and to be parallel to the first roller, for generating a force to separate the first substrate portion from the second substrate portion by rolling of the second roller on the bottom surface of the first substrate portion.

3. A brittle material substrate cutting apparatus according to claim 2, wherein the second roller is arranged so as to be shifted behind the first roller with respect to a moving direction of the pressure.

4. A brittle material substrate cutting apparatus according to claim 1, wherein the cut-face separating section includes:
  a first belt conveyor mechanism for generating a force to separate the first substrate portion from the second substrate portion by circling of a belt while the belt is pressed upon the top surface of the first substrate portion and elastically deformed, the first belt conveyor mechanism having a ring belt wound around a plurality of wheels, rotation axes of the plurality of wheels parallel to each other, a thickness of the belt in its width direction gradually increasing from one side edge thereof toward the other side edge, the thin side edge arranged so as to be adjacent to the cut face; and
  a second belt conveyor mechanism for generating a force to separate the first substrate portion from the second substrate portion by circling of a belt while the belt is pressed upon the bottom surface of the first substrate portion and elastically deformed, the second belt conveyor mechanism having a ring belt wound around a plurality of wheels, rotation axes of the plurality of wheels parallel to each other, a thickness of the belt in its width direction gradually increasing from one side edge thereof toward the other side edge, the thin side edge arranged so as to be adjacent to the cut face.

5. A brittle material substrate cutting apparatus according to claim 4, wherein the second belt conveyor mechanism is arranged so as to be shifted behind the first belt conveyor mechanism with respect to a moving direction of the pressure.

6. A brittle material substrate cutting apparatus according to claim 1, wherein the cut-face separating section includes:
  a first belt conveyor mechanism for generating a force to separate the first substrate portion from the second substrate portion by circling of a belt while the belt is pressed upon the top surface of the first substrate portion, the first belt conveyor mechanism having a ring belt wound around a plurality of wheels, rotation axes of the plurality of wheels is parallel to each other, the first belt conveyor mechanism arranged such that a direction orthogonal to each of the wheels intersects the scribe line at an acute angle in front of a moving direction of the pressure; and
  a second belt conveyor mechanism for generating a force to separate the first substrate portion from the second substrate portion by circling of a belt while the belt is pressed upon the bottom surface of the first substrate portion, the second belt conveyor mechanism having a ring belt wound around a plurality of wheels, rotation axes of the plurality of wheels parallel to each other, the second belt conveyor mechanism arranged so as to oppose the first belt conveyor mechanism with the first substrate portion therebetween.

7. A brittle material substrate cutting apparatus according to claim 6, wherein the second belt conveyor mechanism is arranged so as to be shifted behind the first belt conveyor mechanism with respect to a moving direction of the pressure.

8. A brittle material substrate cutting apparatus according to claim 1, wherein the cut-face separating section contacts a top surface and a bottom surface of the second substrate portion and moves the second substrate portion in a direction to move away the cut face of the second substrate portion from the cut face of the first substrate portion.

9. A brittle material substrate cutting apparatus according to claim 8, wherein the cut-face separating section includes:
 a first roller for generating a force to separate the first substrate portion and the second substrate portion from each other by the rotation of the first roller while pressed upon a top surface of each of the first substrate portion and the second substrate portion and elastically deformed; and
 a second roller for generating a force to separate the first substrate portion and the second substrate portion from each other by the rotation of the second roller while pressed upon a bottom portion corresponding to the top surface of each of the first substrate portion and the second substrate portion pressed by the first roller and elastically deformed.

10. A brittle material substrate cutting apparatus according to claim 1, wherein the cut-face separating section includes:
 a first roller pressed upon the top surface of the first substrate portion and rolling thereon; and
 a second roller arranged so as to oppose the first roller with the first substrate portion therebetween and to oppose the cut face of the first substrate portion, a distance between a outer circumferential surface of the second roller and the first substrate portion gradually increasing from a cut face side of the first substrate portion toward a side of the first substrate portion opposite to the cut face side.

11. A brittle material substrate cutting apparatus according to claim 10, wherein the size of a diameter of the outer circumferential surface of the second roller gradually decreases from the cut face side of the first substrate portion toward the side of the first substrate portion opposite to the cut face.

12. A brittle material substrate cutting apparatus according to claim 10, wherein a diameter of the outer circumferential surface of the second roller is constant, and the second roller is arranged such that the distance between the outer circumferential surface and the first substrate portion gradually increases from the cut face side of the first substrate portion toward the side of the first substrate portion opposite to the cut face.

13. A brittle material substrate cutting apparatus according to claim 1, wherein the second roller is arranged so as to be shifted behind the first roller with respect to a moving direction of the pressure.

14. A brittle material substrate cutting apparatus according to claim 1, wherein the second roller is arranged so as to be shifted behind the first roller with respect to a moving direction of the pressure.

15. A brittle material substrate cutting apparatus according to claim 1, further comprising a substrate holding section for holding the brittle material substrate.

16. A brittle material substrate cutting apparatus according to claim 15, wherein the substrate holding section is provided so as to be movable in a direction in which the cut-face separating section moves the brittle material substrate.

* * * * *